United States Patent
Otsuki et al.

(10) Patent No.: US 11,702,120 B2
(45) Date of Patent: Jul. 18, 2023

(54) INFORMATION PROCESSING APPARATUS, INFORMATION PROCESSING METHOD, AND NON-TRANSITORY COMPUTER READABLE MEDIUM

(71) Applicant: KABUSHIKI KAISHA TOSHIBA, Minato-ku (JP)

(72) Inventors: Tomoshi Otsuki, Kawasaki (JP); Hideki Kubo, Fuchu (JP); Hideyuki Aisu, Kawasaki (JP); Takufumi Yoshida, Funabashi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 514 days.

(21) Appl. No.: 16/816,358

(22) Filed: Mar. 12, 2020

(65) Prior Publication Data
US 2020/0391775 A1    Dec. 17, 2020

(30) Foreign Application Priority Data
Jun. 14, 2019   (JP) ................................. 2019-111569

(51) Int. Cl.
| B61L 27/16 | (2022.01) |
| B61L 27/12 | (2022.01) |
| B61L 27/14 | (2022.01) |
| B61L 27/40 | (2022.01) |
| G06Q 50/30 | (2012.01) |

(52) U.S. Cl.
CPC .............. *B61L 27/12* (2022.01); *G06Q 50/30* (2013.01); *B61L 27/14* (2022.01)

(58) Field of Classification Search
CPC .......... B61L 27/12; B61L 27/14; B06Q 50/30
See application file for complete search history.

(56) References Cited

U.S. PATENT DOCUMENTS

| 9,873,444 B2 | 1/2018 | Kubo | |
| 2014/0365048 A1* | 12/2014 | Kubo | B61L 99/00 |
| | | | 701/19 |
| 2017/0057529 A1* | 3/2017 | Kubo | B61L 27/16 |
| 2020/0156679 A1* | 5/2020 | Otsuki | B61L 27/14 |

FOREIGN PATENT DOCUMENTS

| JP | 5-319269 A | 12/1993 |
| JP | 6-171512 A | 6/1994 |
| JP | 2005-41332 A | 2/2005 |
| JP | 4727459 B2 | 7/2011 |
| JP | 6062790 B2 | 1/2017 |
| JP | 2017-65435 A | 4/2017 |
| JP | 2020-82920 A | 6/2020 |
| WO | WO 2016/147212 A1 | 9/2016 |

OTHER PUBLICATIONS

U.S. Appl. No. 16/567,913, filed Sep. 11, 2019, Otsuki, et al.

* cited by examiner

*Primary Examiner* — Adam D Tissot
(74) *Attorney, Agent, or Firm* — Oblon, McClelland, Maier & Neustadt, L.L.P.

(57) ABSTRACT

An information processing apparatus according to an embodiment includes a diagram processor configured to calculate, based on a first diagram of first to n-th train lines including at least one time of: times of departure of a vehicle from stop positions, times of arrival of the vehicle at the stop positions, and times of pass of the vehicle through the stop positions, an adjustment amount of the time; and an output diagram creator configured to create a second diagram based on the calculated adjustment amount and the first diagram.

16 Claims, 29 Drawing Sheets

| TRAIN | MOVEMENT IN PREMISE | M1 | M2 |

TRAIN INFORMATION TIMETABLE MARGIN TIME

| STATION | TRACK | PASS/DWELL | ARRIVAL TIME | DEPARTURE TIME | OPERATION TIME | DWELL TIME |
|---|---|---|---|---|---|---|
| A | 1 | DWELL | | 8:00 | | |
| B | 1 | DWELL | 8:10 | 8:12 | 00:10 | 00:02 |
| C | 1 | DWELL | 8:32 | | 00:20 | |

⋮

TRAIN NUMBER 000001
TYPE REGULAR/IRREGULAR LOCAL REGULAR
FORM | SECTION
REFERENCE TRAIN

| DEPARTURE TIME CHANGE | CHANGE |
|---|---|
| DEPARTURE TIME 8:00 | |
| FORWARD | REARWARD |
| COPY FORWARD COPY | REARWARD COPY |
| INTERVAL x NUMBER OF TIMES | |
| DIVIDE | DIVIDE |
| STATION | |
| DELETE | DELETE |

FIG. 3

| TRAIN LINE ID | TIME | STATION | TYPE |
|---|---|---|---|
| TRAIN LINE 1 | 8:00 | A | DEPARTURE |
| | 8:10 | B | ARRIVAL |
| | 8:12 | B | DEPARTURE |
| | 8:32 | C | ARRIVAL |
| TRAIN LINE 2 | 8:20 | A | DEPARTURE |
| | 8:28 | B | PASS |
| | 8:44 | C | ARRIVAL |
| TRAIN LINE 3 | 8:30 | A | DEPARTURE |
| | 8:40 | B | ARRIVAL |
| | 8:42 | B | DEPARTURE |
| | 9:02 | C | ARRIVAL |

FIG. 4

| NODE ID | TRAIN LINE ID | TIME | STATION | TYPE | | Pnode2 |
|---|---|---|---|---|---|---|
| 1 | 1 | 5:00 | A | DEPARTURE | 0 | 0 |
| 2 | 1 | 5:06 | B | ARRIVAL | 1 | 0 |
| 3 | 1 | 5:07 | B | DEPARTURE | 2 | 0 |
| 4 | 1 | 5:15 | C | ARRIVAL | 3 | 0 |
| 5 | 1 | 5:18 | C | DEPARTURE | 4 | 13 |
| 6 | 1 | 5:26 | D | ARRIVAL | 5 | 14 |
| 7 | 1 | 5:27 | D | DEPARTURE | 6 | 0 |
| 8 | 1 | 5:33 | E | ARRIVAL | 7 | 16 |
| 9 | 1 | 5:34 | E | DEPARTURE | 8 | 0 |
| 10 | 2 | 5:06 | A | DEPARTURE | 1 | 0 |
| 11 | 2 | 5:10 | B | PASS | 10 | 3 |
| 12 | 2 | 5:16 | C | ARRIVAL | 11 | 4 |
| 13 | 2 | 5:17 | C | DEPARTURE | 12 | 0 |
| 14 | 2 | 5:23 | D | PASS | 13 | 0 |
| 15 | 2 | 5:27 | E | ARRIVAL | 14 | 0 |
| 16 | 2 | 5:28 | E | DEPARTURE | 15 | 0 |

FIG. 7

- MINIMUM DWELL TIME
  - MINIMUM DWELL TIME AT STATION A 1 MINUTE
  - MINIMUM DWELL TIME AT STATION B 1 MINUTE
  - MINIMUM DWELL TIME AT STATION C 1 MINUTE
  - . . .

- MINIMUM RUN TIME (BY TYPE/SECTION)
  - MINIMUM RUN TIME BETWEEN STATIONS A AND B (LOCAL/INBOUND): 6 MINUTES
  - MINIMUM RUN TIME BETWEEN STATIONS B AND C (LOCAL/INBOUND): 8 MINUTES
  - MINIMUM RUN TIME BETWEEN STATIONS C AND D (LOCAL/INBOUND): 8 MINUTES
  - MINIMUM RUN TIME BETWEEN STATIONS D AND E (LOCAL/INBOUND): 6 MINUTES
  - MINIMUM RUN TIME BETWEEN STATIONS A AND B (EXPRESS/INBOUND): 4 MINUTES
  - MINIMUM RUN TIME BETWEEN STATIONS B AND C (EXPRESS/INBOUND): 6 MINUTES
  - MINIMUM RUN TIME BETWEEN STATIONS C AND D (EXPRESS/INBOUND): 6 MINUTES
  - MINIMUM RUN TIME BETWEEN STATIONS D AND E (EXPRESS/INBOUND): 4 MINUTES

- MINIMUM RUN TIME BETWEEN STATIONS B AND A (LOCAL/OUTBOUND): 8 MINUTES
  - MINIMUM RUN TIME BETWEEN STATIONS C AND B (LOCAL/OUTBOUND): 6 MINUTES
  - . . .

- TIME INTERVAL (MINIMUM INTERVAL TIME)
  - TIME INTERVAL BETWEEN PARALLEL TRAIN LINES (DEPARTURE ® ARRIVAL, DEPARTURE ® PASS) IS 2 MINUTES
  - TIME INTERVAL OF WAITING (ARRIVAL ® ARRIVAL, DEPARTURE ® DEPARTURE) IS 1 MINUTE
  - . . .

FIG. 8

| NODE ID | TRAIN LINE ID | TIME | STATION | TYPE | Pnode1 | MINIMUM IV1 | Pnode2 | MINIMUM IV2 |
|---|---|---|---|---|---|---|---|---|
| 1 | 1 | 5:00 | A | DEPARTURE | 0 | 0 | 0 | 0 |
| 2 | 1 | 5:06 | B | ARRIVAL | 1 | 6 | 0 | 0 |
| 3 | 1 | 5:07 | B | DEPARTURE | 2 | 1 | 0 | 0 |
| 4 | 1 | 5:15 | C | ARRIVAL | 3 | 8 | 0 | 0 |
| 5 | 1 | 5:18 | C | DEPARTURE | 4 | 1 | 13 | 1 |
| 6 | 1 | 5:26 | D | ARRIVAL | 5 | 8 | 14 | 2 |
| 7 | 1 | 5:27 | D | DEPARTURE | 6 | 1 | 0 | 0 |
| 8 | 1 | 5:33 | E | ARRIVAL | 7 | 6 | 16 | 2 |
| 9 | 1 | 5:34 | E | DEPARTURE | 8 | 1 | 0 | 0 |
| 10 | 2 | 5:06 | A | DEPARTURE | 1 | 2 | 0 | 0 |
| 11 | 2 | 5:10 | B | PASS | 10 | 4 | 3 | 2 |
| 12 | 2 | 5:16 | C | ARRIVAL | 11 | 6 | 4 | 1 |
| 13 | 2 | 5:17 | C | DEPARTURE | 12 | 1 | 0 | 0 |
| 14 | 2 | 5:23 | D | PASS | 13 | 6 | 0 | 0 |
| 15 | 2 | 5:27 | E | ARRIVAL | 14 | 4 | 0 | 0 |
| 16 | 2 | 5:28 | E | DEPARTURE | 15 | 1 | 0 | 0 |

FIG. 9

- AVERAGE DELAY TIME BETWEEN STATIONS A AND B (LOCAL) 2 MINUTES
- AVERAGE DELAY TIME BETWEEN STATIONS A AND B (EXPRESS) 2 MINUTES
- AVERAGE DELAY TIME BETWEEN STATIONS B AND C (LOCAL) 2 MINUTES
- AVERAGE DELAY TIME BETWEEN STATIONS B AND C (EXPRESS) 2 MINUTES
- · · ·

- AVERAGE DELAY TIME OF STATION A DWELL TIME 1 MINUTE
- AVERAGE DELAY TIME OF STATION B DWELL TIME 1 MINUTE
- AVERAGE DELAY TIME OF STATION C DWELL TIME 1 MINUTE

FIG. 17

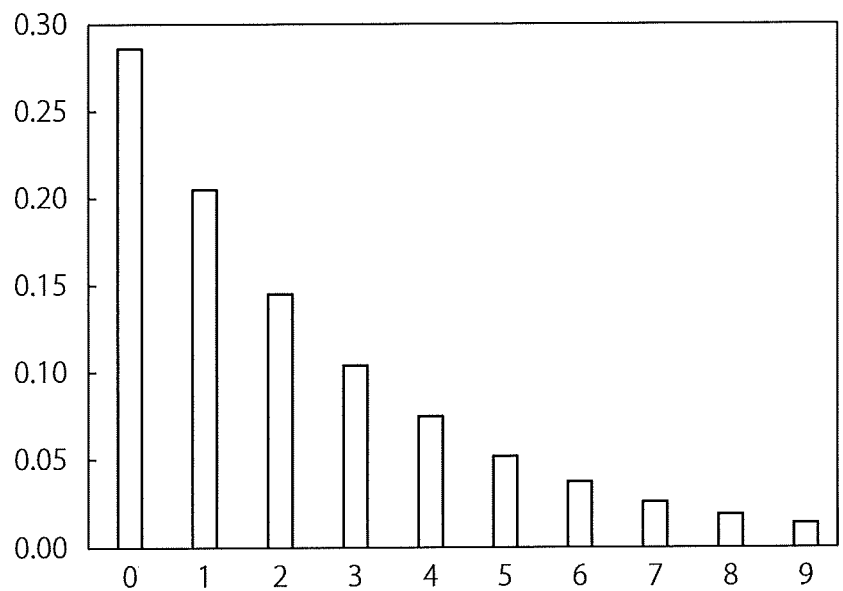

FIG. 18

BEFORE MOVEMENT OF BLOCKS

AFTER MOVEMENT OF BLOCKS
(IN CASE OF $X_0=0$, $X_1=1$, $X_5=2$)

| NODE ID | TRAIN LINE ID | STATION | TYPE | FASTEST TIME (MINUTE) | BLOCK ID | SHIFT VALUE (MINUTE) | TIME AFTER SHIFT (MINUTE) |
|---|---|---|---|---|---|---|---|
| 1 | 1 | A | DEPARTURE | 0 | 0 | 4.4 | 4.4 |
| 2 | 1 | B | ARRIVAL | 6 | 0 | 4.4 | 10.4 |
| 3 | 1 | B | DEPARTURE | 7 | 1 | 4.8 | 11.8 |
| 4 | 1 | C | ARRIVAL | 15 | 1 | 4.8 | 19.8 |
| 5 | 1 | C | DEPARTURE | 18 | 2 | 26.8 | 44.8 |
| 6 | 1 | D | ARRIVAL | 26 | 2 | 26.8 | 52.8 |
| 7 | 1 | D | DEPARTURE | 27 | 3 | 32.8 | 59.8 |
| 8 | 1 | E | ARRIVAL | 33 | 3 | 32.8 | 65.8 |
| 9 | 1 | E | DEPARTURE | 34 | 4 | 39.4 | 73.4 |
| 10 | 2 | A | DEPARTURE | 6 | 5 | 12.8 | 18.8 |
| 11 | 2 | B | PASS | 10 | 5 | 12.8 | 22.8 |
| 12 | 2 | C | ARRIVAL | 16 | 5 | 12.8 | 28.8 |
| 13 | 2 | C | DEPARTURE | 17 | 6 | 12.8 | 29.8 |
| 14 | 2 | D | PASS | 23 | 6 | 12.8 | 35.8 |
| 15 | 2 | E | ARRIVAL | 27 | 6 | 12.8 | 39.8 |
| 16 | 2 | E | DEPARTURE | 28 | 7 | 32.8 | 60.8 |
| ... | ... | ... | ... | ... | ... | ... | ... |

FIG. 26

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2019-111569, filed on Jun. 14, 2019, the entire contents of which are incorporated herein by reference.

FIELD

Embodiments described herein relate to an information processing apparatus, an information processing method, and a non-transitory computer readable medium.

BACKGROUND

For railway companies and the like, delays in service planning diagrams, which are simply called diagrams, are serious problems bringing about decreases in sales and increases in costs such as penalty payments. Therefore, it is desirable to create a diagram having delay robustness.

BRIEF DESCRIPTION OF THE DRAWINGS

FIG. 3 shows an example of an interface screen (an input screen) on which a diagram is input;

FIG. 4 shows an example of a diagram in the form of a table;

FIG. 7 shows the other example of the diagram in the form of a table;

FIG. 8 shows an example of event-to-event interval information;

FIG. 9 shows an example in which the event-to-event interval information is added to arcs between nodes and preceding nodes;

FIG. 17 shows an example of an average of delay times of run times among stations and an average of delay times of dwell times at the stations;

FIG. 18 shows an example of a geometrical distribution as an event-to-event delay distribution;

FIG. 26 shows data representing a process for obtaining an output diagram;

DETAILED DESCRIPTION

An information processing apparatus according to an embodiment includes a diagram processor configured to calculate, based on a first diagram of first to n-th train lines including at least one time of: times of departure of a vehicle from stop positions, times of arrival of the vehicle at the stop positions, and times of pass of the vehicle through the stop positions, an adjustment amount of the time; and an output diagram creator configured to create a second diagram based on the calculated adjustment amount and the first diagram.

An embodiment of the present invention will be described below with reference to the drawings.

Figure 1:
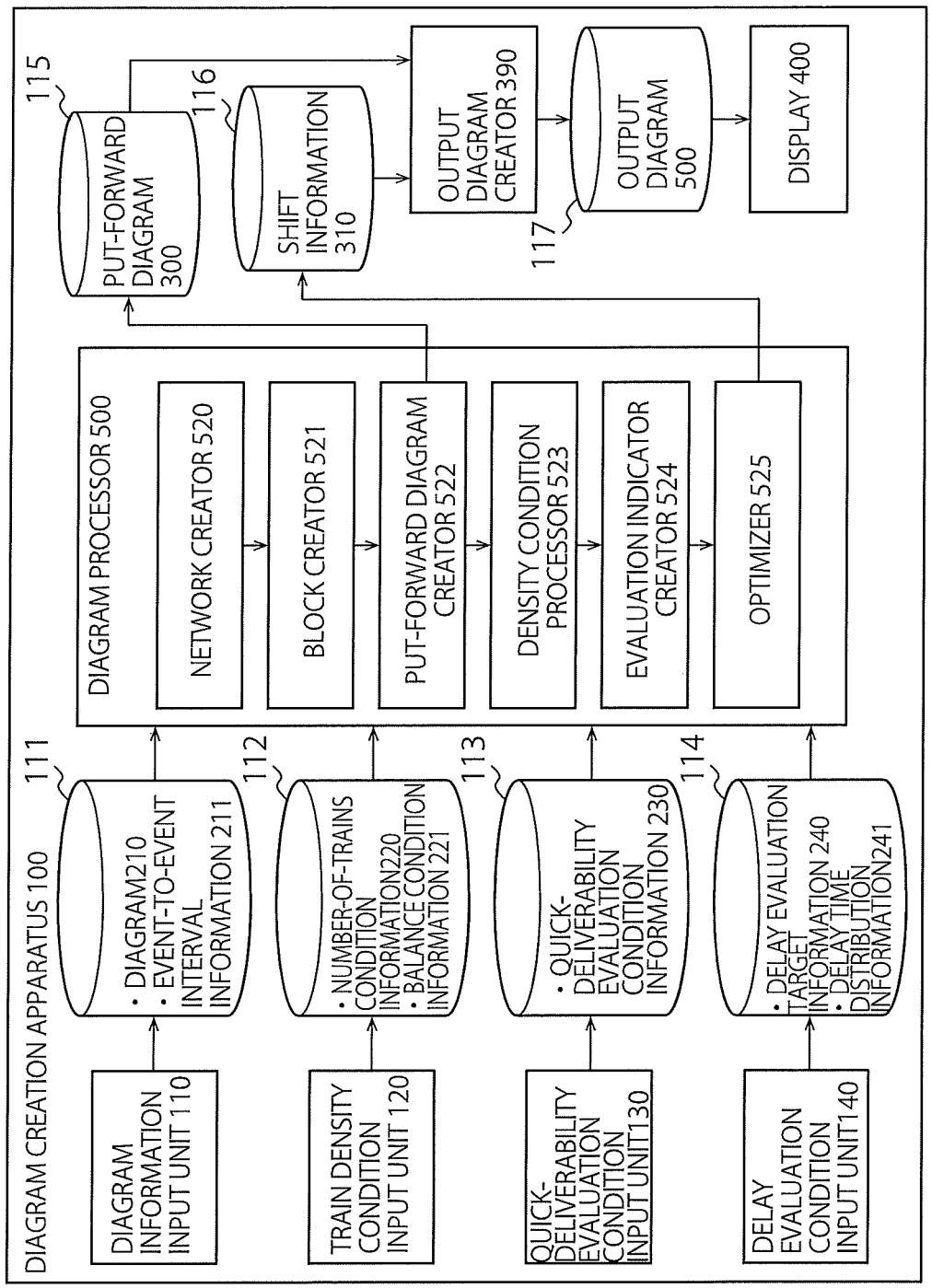
FIG. 1 is a block diagram of a diagram creation apparatus, which is an information processing apparatus according to an embodiment.

FIG. 1 is a block diagram of a diagram creation apparatus 100, which is an information processing apparatus according to the present embodiment. The diagram creation apparatus 100 includes a diagram information input unit 110, a train density condition input unit 120, a quick-deliverability evaluation condition input unit 130, a delay evaluation condition input unit 140, a diagram processor 500, an output diagram creator 390, a display (an output GUI) 400, and a plurality of storages. The diagram processor 500 includes a network creator 520, a block creator 521, a front-packed diagram creator 522, a density condition processor 523, an evaluation indicator creator 524, and an optimizer 525. The plurality of storages include a storage 111, a storage 112, a storage 113, a storage 114, a storage 115, a storage 116, and a storage 117.

The diagram creation apparatus 100 calculates adjustment amounts of times of events in a diagram (a first diagram), which decides operation schedules of vehicles such as trains or buses (in the following description, trains are assumed), based on restriction conditions relating to arrangement intervals of train lines of the trains and indicators (evaluation indicators) for evaluating various performances required of the diagram and creates an output diagram (a second diagram) based on the calculated adjustment amounts and the diagram.

The diagram represents a series of at least one event relating to a plurality of vehicles (trains, buses, or the like). The event includes a stop position (place) and a time of departure from the stop position, a time of arrival at the stop position, or a time of pass through the stop position. That is, the event is data associating the stop position and the time. The stop positions are, for example, stations, bus stops, detention spaces, depots, or signal stations. In the following description, trains will be mainly assumed as the vehicles. However, the same is true for other kinds of vehicles such as buses, by appropriately replacing words as necessary according to differences between tripping systems. For example, in the description of the specification, a station is replaced with a bus stop, and the like.

The train line is data including, about stop positions of an operation route including one or a plurality of stop positions for the same vehicle, at least one of times of departure from the stop positions, times of arrival at the stop positions, and times of pass through the stop positions. More specifically, the train line means a series of events relating to the stop positions about the operation route including the one or the plurality of stop positions for the same vehicle. In this specification, the train line is sometimes simply described as line.

Examples of the restriction conditions relating to the arrangement intervals of the train lines in the present embodiment include a condition of time restrictions among events and a condition (a density condition) of the number of train lines included in a predetermined period. Securing the number of train lines is equivalent to securing transportation capacity of a train.

The various performances required of the diagram in the present embodiment are performances for, for example, enabling passengers to arrive at destinations as early as possible (quick-deliverability), standardizing intervals among train lines, and preventing the diagram from being easily affected by a delay (delay robustness). A method of creating evaluation indicators for evaluating the various performances will be described below.

The present embodiment realizes, based on the restriction conditions and the evaluation indicators relating to the various performances, creation of a diagram having delay robustness. More preferably, the present embodiment realizes creation of a diagram satisfying at least one of the performances for enabling passengers to arrive at destinations as early as possible (quick-deliverability) and standardizing intervals among train lines.

In the following description, prior to a description of the diagram creation apparatus 100, the time restrictions among evens in a diagram will be briefly described.

Generally, in generation of a diagram, a delay in a train is supposed, and a time point of an event (departure time, arrival time, or the like) is determined in many cases by adding a margin time to a minimum value of a run time between stations or a minimum value of a dwell time at a station. Moreover, a restriction related to a time interval (time interval restriction) is provided in many cases between a train line of a certain train (self train line) and a train line of another train preceding the certain train (preceding train line). If a delay time on the preceding train line exceeds a predetermined value, the delay time influences on the train of the self train line. More specifically, there are two types of delays: a delay on the self train line and a delay due to the preceding train line. In more detail, delays include a delay due to a preceding event on the self train line (a delay due to self train line) and a delay due to a preceding event on the preceding train line (a delay due to other train lines). The two types of a delay on the self train line and a delay from the preceding train line influence on the train of the self train line.

Figure 2A:
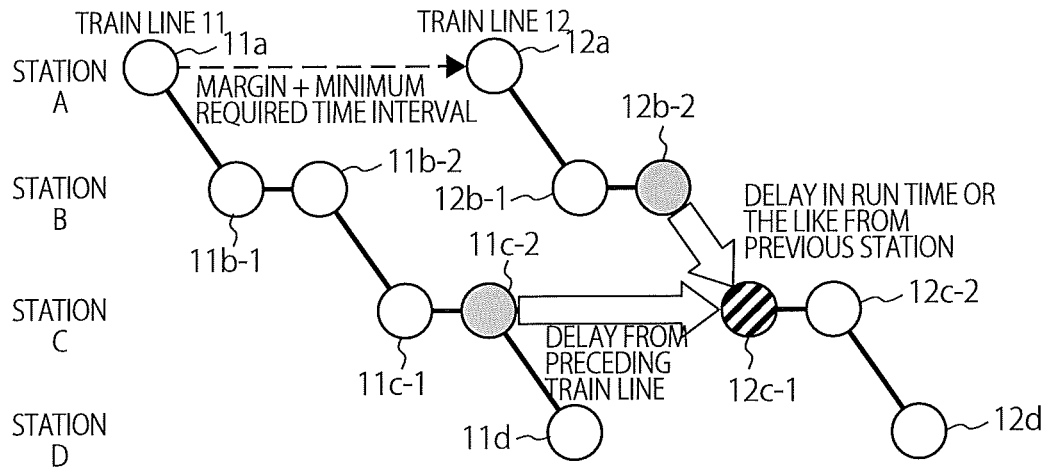
FIGS. 2A and 2B are diagrams for describing overviews of diagrams.

FIG. 2A shows graphs of a train line 11 of a certain train and graphs of a train line 12 of another train in the form of a network. Circles in the diagrams are nodes, which represent events. The train line 11 includes an event 11a of departure from A station, an event 11b-1 of arrival at B station, an event 11b-2 of departure from the B station, an event 11c-1 of arrival at C station, an event 11c-2 of departure from the C station, and an event 11d of arrival at D station (the nodes corresponding to the events are denoted by the same reference signs). A time in a diagram is set on each event. A rightward direction along a plane of the drawing is a time direction. The train line 12 is a train line of another train that trips along the same path as the train line 11 (a train line following the train line 11). The train line 12 includes an event 12a of departure from the A station, an event 12b-1 of arrival at the B station, an event 12b-2 of departure from the B station, an event 12c-1 of arrival at the C station, an event 12c-2 of departure from the C station, and an event 12d of arrival at the D station. It is assumed that only one track exists for each of an inbound line (from the A station toward the D station) and an outbound line (from the D station toward the A station) at each station. Here, an arrival event of the other train at the C station (the event 12c-1) will be considered. A delay in the event 12c-1 is influenced on a delay in the first preceding event 12b-2 on the train line 12 (a delay due to self train line) and a delay in the event 11c-2 on the preceding train line (the train line 11) at the same C station (a delay due to other train lines). The delay in the event 12c-1 may be influenced on events at the C station (the event 11c-1 and the like) other than the event 11c-2. Specific examples of the delay due to self train line include a delay in a run time from the previous B station and a delay in a dwell time of departure from (departure time at) the preceding B station. Specific examples of the delay due to other train lines include a delay in departure from the C station on the preceding train line 11. A required time interval, which is a time interval to be left, and a margin time are provided between events. In the embodiment, a case is described in which the required time interval is a minimum required time interval which is a minimum time interval to be left. For example, the minimum required time interval or a longer time interval needs to be left between the event 11a and the event 12a. As an example, a time interval between the event 11a and the event 12a in the diagram is the minimum required time interval plus the margin time. If a time period from departure of a train from the A station until departure of another train from the A station exceeds the minimum required time interval but is not longer than the minimum required time interval plus the margin time, no delay occurs between the event 11a and the event 12a. That is, if a delay time (an excess time interval over the minimum required time interval) between the event 11a and the event 12a is not longer than the margin time, no delay occurs between the events.

Figure 2B:
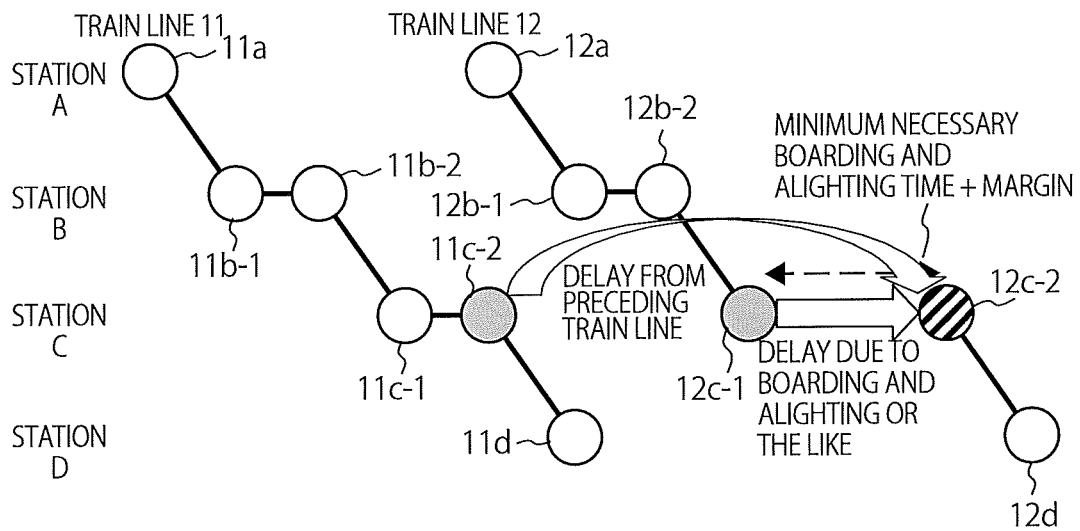

Although the description is focused on an arrival event (the event 12c-1) in FIG. 2A, the same is true for a departure event. In FIG. 2B, a departure event (the event 12c-2) at the C station will be considered. A delay in the event 12c-2 is influenced on a delay in the first preceding event 12c-1 on the train line 12 (a delay due to self train line) and a delay in an event on the preceding train line 11 (departure event 11*c*-2 at the C station) (a delay due to other train lines). Specific examples of the delay due to self train line include a delay in arrival at the C station and a delay in dwell time at the C station (a prolonged boarding and alighting time, or the like). A minimum time interval to be left (minimum required time interval) and a margin time are provided between events. For example, the minimum required time interval (a minimum required boarding and alighting time) or a longer time interval is required to be left between the event 12*c*-2 and the event 12*c*-1. As an example, a time interval between the event 12*c*-2 and the event 12*c*-1 in the diagram is the minimum required time interval plus the margin time. If a time interval from arrival at the C station until departure from the C station exceeds the minimum required time interval but is not longer than the minimum required time interval plus the margin time, no delay occurs between the event 12*c*-2 and the event 12*c*-1. That is, if a delay time (an excess time interval over the minimum required time interval) between the two events is not longer than the margin time, no delay occurs between the events. The minimum required time interval is used as a time interval that needs to be left between the events. However, a time interval other than the minimum required time interval such as a time interval usually expected to be left may be used. The same applies in the present embodiment described in detail below.

The diagram creation apparatus 100 shown in FIG. 1 will be described in detail below.

The Diagram Information Input Unit 110, a Diagram 210, and Event-to-Event Interval Information 211

The diagram information input unit 110 shown in FIG. 1 acquires a diagram 210 and stores the acquired diagram 210 in the storage 111. As an example, the diagram information input unit 110 is an input unit such as a keyboard, a mouse, or a touch panel operated by an operator of the diagram creation apparatus 100. In such a case, the diagram creation apparatus 100 includes a function of presenting an interface screen for inputting a diagram. The interface screen is displayed on the display 400.

The display 400 is a display device such as an LCD (liquid crystal display), a CRT (cathode ray tube), or a PDP (plasma display panel) that displays data or information.

The diagram information input unit 110 may be an acquirer that acquires the diagram 210 from an external apparatus or a storage medium. In such a case, the external apparatus is, as an example, an external server connected to the diagram creation apparatus 100 through a wired or wireless communication network. The storage medium is, as an example, a storage medium disposed within the diagram creation apparatus 100 or a storage medium externally connected. Examples of the storage medium include a memory device, a hard disk, an SSD, and an optical disk. A trigger for the acquisition of the diagram may be an instruction from the operator of the diagram creation apparatus 100, or may be any other condition (for example, it becoming a predetermined time).

FIG. 3 shows an example of the interface screen (input screen) on which the diagram 210 is input. The operator can input the diagram from the screen.

FIG. 3 shows an example of the screen on which train line information of a certain train is input. The input screen includes a timetable menu M1 and a margin time menu M2. In the FIG. 3, a screen for the timetable menu M1 is displayed.

The train is operated from A station to C station. The train departs from the A station, dwells at B station, and dwells at the C station. Since the train dwells at the A station, the B station, and the C station, each respective dwell/pass item (indicating whether the train dwells or passes) is set for "dwell". A time point of departure (hereinafter, a departure time) from the A station, a time point of arrival (hereinafter, an arrival time) and a departure time at the B station, and an arrival time at the C station are set. A run time from the A station to the B station (time of duration from the departure time at the A station until the arrival time at the B station) and a dwell time at the B station (time of duration from the arrival time at the B station until the departure time at the B station) are set. It is set that the train dwells at a first track at each station. Each of departure from the A station at 8:00, arrival at the B station at 8:10, departure from the B station at 8:12, arrival at the C station at 8:32, and the like corresponds to one event, and a series of such events corresponds to a train line (or line information).

In a train number item, a train number (here, "000001") can be set. In a type item, it can be set whether the train is local (dwelling at each station) or express. A value ("dwell" or "pass") in the dwell/pass item for each station may be automatically input depending on whether the train is local or express. In a regular/irregular item, it can be set whether the train is operated regularly or irregularly. As an example, in case of "regular", this train line information is applied on weekdays, and in case of "irregular", the train line information is applied on weekends.

FIG. 4 shows part of the diagram 210 input from the diagram information input unit 110, in the form of a table.

The table in FIG. 4 includes three kinds of train line information of mutually different vehicles (trains) tripping from the A station to the C station. As an example, the vehicles correspond to first to n-th vehicles. Three train lines correspond to first to n-th train lines. The diagram includes columns of train line ID, time, station, and type of an event. The type is a type of an event indicating departure, arrival, pass, or the like. In the table shown in FIG. 4, the diagram includes information relating to a train line 1 that departs at 8:00, a train line 2 that departs at 8:20, and a train line 3 that departs at 8:30. The train line 1 corresponds to the train line illustrated in FIG. 3. The train line 1 and the train line 3 do not include a pass event because the vehicles dwell at all stations. On the other hand, in the train line 2, since the vehicle passes through the B station, a pass event is set on the B station.

Figure 5:
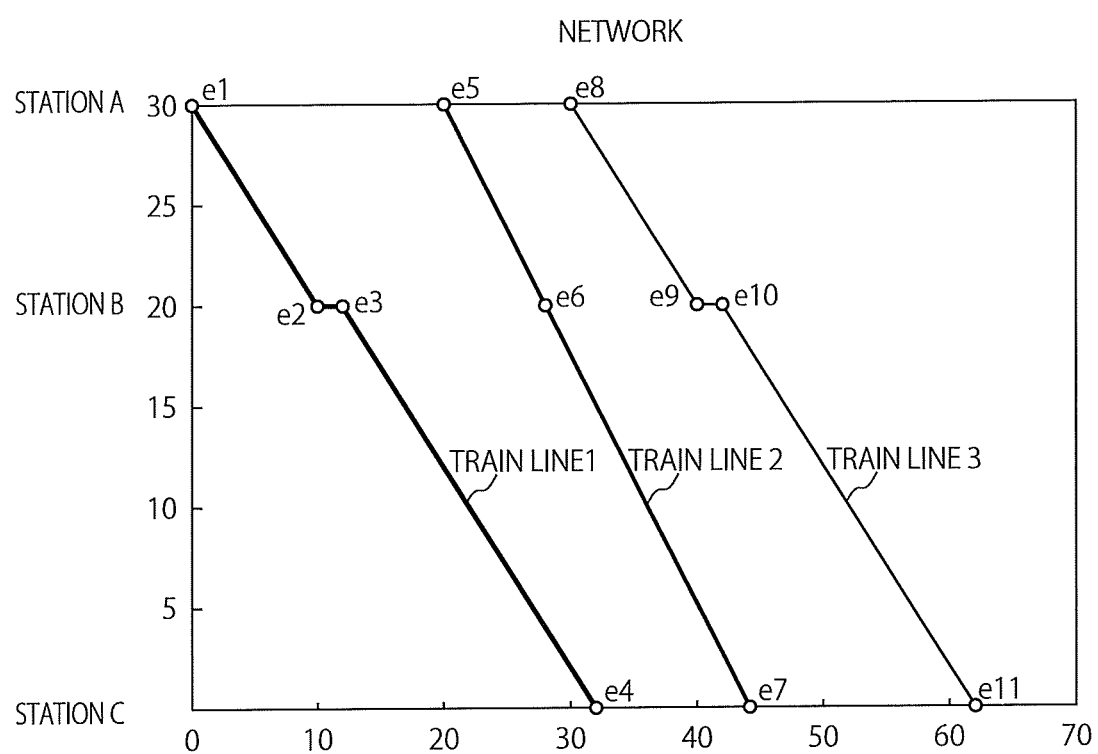
FIG. 5 shows the example of the diagram in the form of graphs.

FIG. 5 shows the train lines 1 to 3 included in the diagram shown in FIG. 4, each in the form of a graph (network). A horizontal axis corresponds to time, and a vertical axis corresponds to distance. The horizontal axis shows relative time, and in the present example, "0" corresponds to 8:00. Each graph (network) includes nodes corresponding to events and arcs connecting the nodes. The arcs represent propagation possibility among the events. More specifically, the graph of the train line 1 includes nodes e1, e2, e3, and e4 corresponding to chronological events (events 1, 2, 3, and 4, respectively) included in the train line 1, and arcs connecting the nodes. Similarly, the graph of the train line 2 includes node e5, e6, and e7 corresponding to chronological events (events 5, 6, and 7, respectively) included in the train line 2, and arcs connecting the nodes. The graph of the train line 3 includes nodes e8, e9, e10, and e11 corresponding to chronological events (events 8, 9, 10, and 11, respectively) included in the train line 3, and arcs connecting the nodes.

Figure 6:
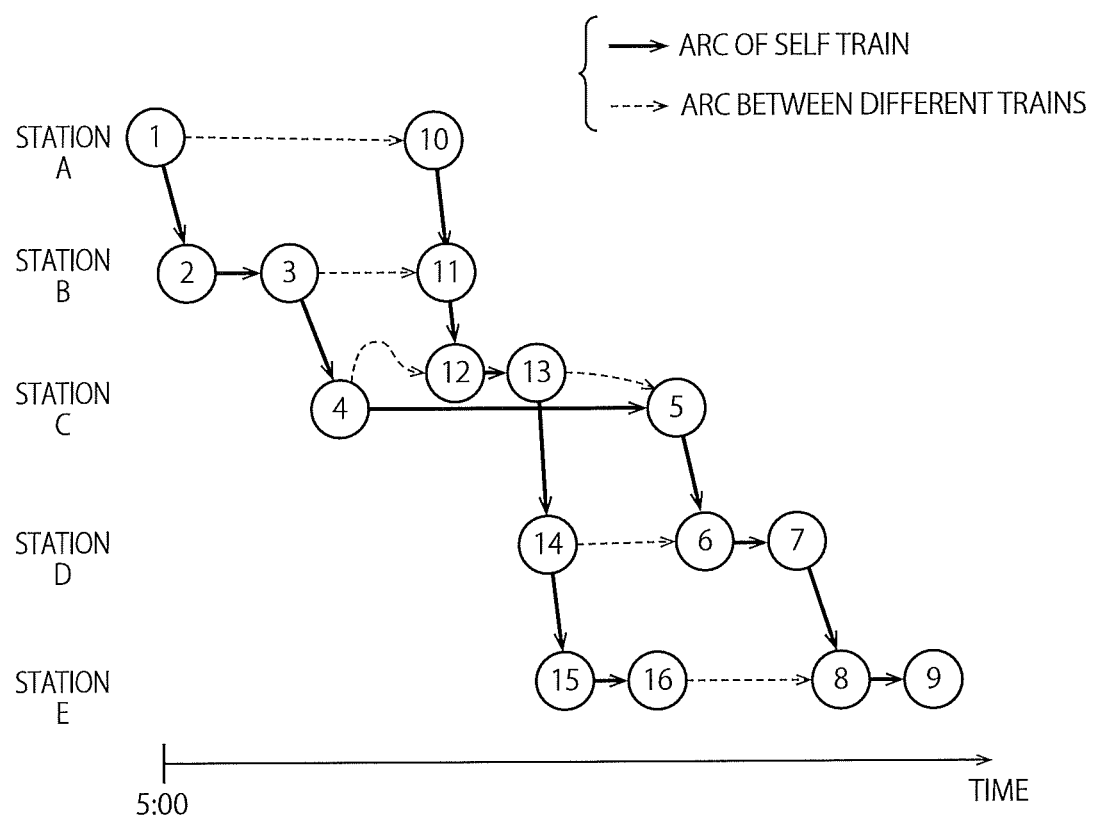
FIG. 6 shows another example of the diagram in the form of graphs.

FIG. 6 shows a graph (a network) of another example of the diagram 210 input from the diagram information input unit 110. FIG. 7 shows, in the form of a table, as an attribute of each of the nodes, the diagram 210 including the same content as the content of FIG. 6. A form of the diagram 210 input from the diagram information input unit 110 may be either the form of a table of FIG. 7 or the form of graphs (the network) of FIG. 6. One of the table and the graph may be input and converted into the other. In the present embodiment, it is assumed that the diagram 210 of the form of a table is input and is converted into the network by the network creator 520 described below.

In FIG. 6, a train 1 (a train, a train line ID of which is 1) departing at 5:00 represents a local train that dwells at all of the A, B, C, D, and E stations. A train 2 (a train, a train line ID of which is 2) departing at 5:06 represents an express train that passes through the station B and the station D. Since the train 1 dwells at all the stations, nodes of a train line (the train line 1) of the train 1 are either departure nodes or arrival nodes. A train line (the train line 2) of the train 2 is represented by pass nodes relating to pass stations. The other stations are departure nodes or arrival nodes. At the station C, the train 1 waits for the train 2. The train 2 passes through or arrives at the station D and the subsequent stations earlier than the train 1. Broken line arcs represent arcs among train lines of different trains. Solid line arcs represent arcs in a train line of the self train. Examples of arcs among the train lines of the different trains include arcs among a plurality of trains that use the same track and arcs among a continuous plurality of trains when there is turnaround.

The diagram shown in FIG. 7 includes a node ID (IDs of the nodes), a train line ID (an ID of the train), time (time on a timetable; the illustrated example is represented by, for example, an hour and a minute), a station, a type of a node (an event), Pnode1 (a node ID of a first preceding node; 0 if the first preceding node is absent) and Pnode2 (a node ID of a second preceding node; 0 if the second preceding node is absent). The order of the Pnode1 and the Pnode2 may be optional. The Pnode1 and the Pnode2 may be interchanged. As a difference from the example shown in FIG. 4, the node ID, the Pnode1, and the Pnode2 are added. A user may directly input the Pnode1 and the Pnode2. The Pnode1 and the Pnode2 may be calculated by an arithmetic operation from other input information. The number of preceding nodes (Pnodes) is sometimes three or more. In that case, a necessary number of kinds of information only have to be included.

The information shown in FIG. 6 or 7 may be extracted from information of an existing diagram. The user may input these kinds of information using the input screen shown in FIG. 3. Concerning trains, one-way operations are represented as train lines. However, several round-trip operations may be represented as train lines.

In the above description, the example shown in FIGS. 4 and 5 and the example shown in FIGS. 6 and 7 are described as the examples of the diagram. However, the following description is based mainly on the graph information of the form shown in FIGS. 6 and 7.

The diagram information input unit 110 shown in FIG. 1 acquires the event-to-event interval information 211 besides the diagram 210 and stores the acquired event-to-event interval information 211 in the storage 111. A specific example of a method of acquiring the event-to-event interval information 211 is the same as the method of acquiring the diagram 210. The event-to-event interval information 211 may be simply referred to as interval information. Details of the event-to-event interval information 211 will be described below.

The event-to-event interval information 211 represents a minimum time interval defined in an arc (between nodes).

FIG. 8 shows an example of the event-to-event interval information 211 corresponding to the example shown in FIGS. 6 and 7. In the event-to-event interval information 211, minimum dwell times at the stations and minimum run times among the stations (in sections) are decided as restrictions of time intervals (time interval restrictions) among events in the self train line. The minimum run times are decided for each of types (local, express, and the like). The minimum dwell times may be decided for each of the types.

As a time interval restriction between the preceding train line and the self train line, a time interval (a minimum interval time) that should be at least left between arrival time of the preceding train line and departure time of the self train line is decided. The minimum interval time is decided between events in the same station in the preceding train line and the self train line. However, the minimum interval time may be decided between events in different stations in the preceding train line and the self train line.

Figure 10:
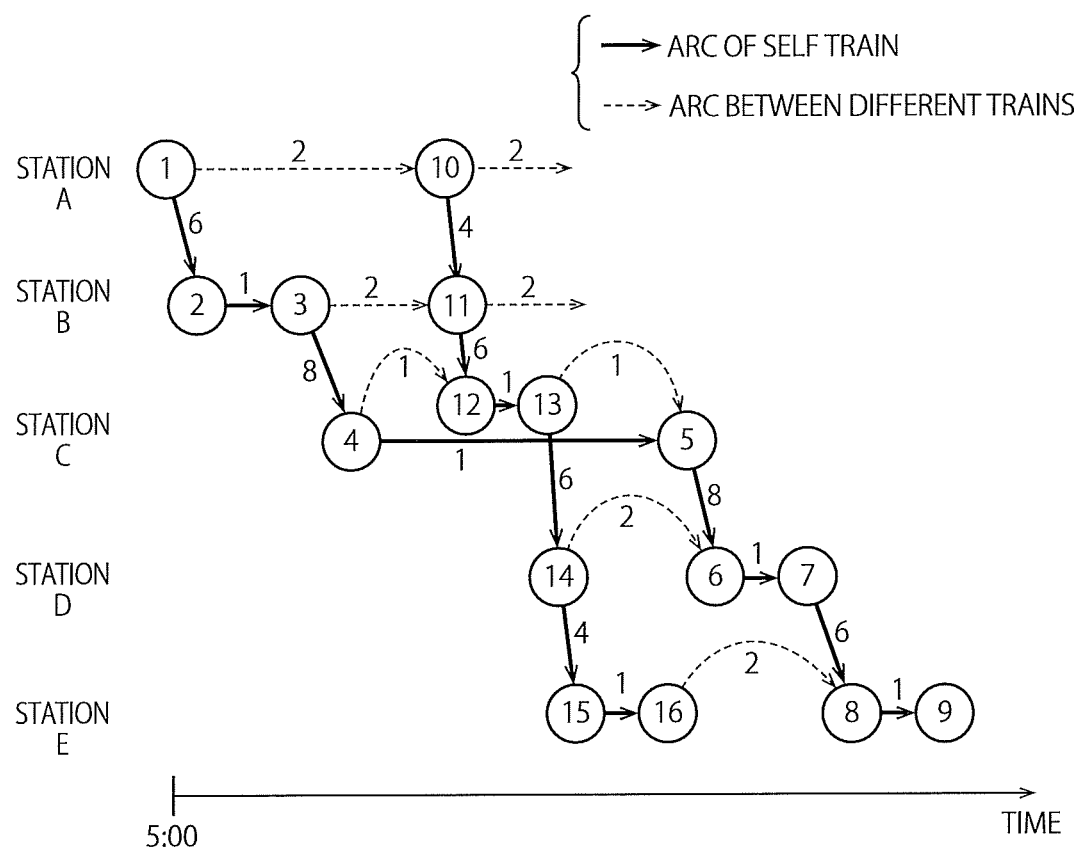
FIG. 10 shows a table of FIG. 9 in the form of graphs.

FIG. 9 shows an example of a table in which, for all the nodes shown in FIG. 7, the event-to-event interval information 211 is added to the arc between the preceding nodes (the Pnode1 and the Pnode2). FIG. 10 shows the table of FIG. 9 as a graph. This is equivalent to the table in which, for all the nodes in the graph of FIG. 6, the event-to-event interval information 211 is added to the arcs between the nodes and the preceding nodes of the nodes.

When a plurality of tracks are present, arrival-arrival time intervals and departure-departure time intervals of the same track and different tracks may be distinguished and treated. When there is turnaround, a restriction of a time interval relating to the turnaround may be given. In the case of overtaking, pass, or the like, a time interval value different from an arrival-arrival time interval, a departure-departure time interval, or the like may be used. A different time interval value may be used depending on a type of a vehicle and a time period when the vehicle runs (for example, rush hour or not).

Instead of inputting the event-to-event interval information 211, information relating to a margin time given between stations or the like may be input. In such a case, in the diagram creation apparatus, the event-to-event interval information 211 can be obtained by calculating a difference between a time difference on a diagram and the margin time. The event-to-event interval information 211 may be calculated from information such as a distance between stations and maximum speed and acceleration performance of each vehicle.

The event-to-event interval information 211 is defined as representing a minimum time interval defined in an arc (between nodes). However, the event-to-event interval information 211 is not limited to the minimum time interval if the event-to-event interval information 211 is a value relating to a time of the ark (a time interval between the nodes). For example, the event-to-event interval information 211 may be a time usually desired to be left between events.

The Train Density Condition Input Unit 120, Number-of-Trains Condition Information 220, and Balance Condition Information 221

The train density condition input unit 120 shown in FIG. 1 acquires number-of-trains condition information 220 and balance condition information 221 and stores the acquired information in the storage 112. A specific implementation example of the train density condition input unit 120 is the same as the implementation example of the diagram information input unit 110.

The number-of-trains condition information 220 is information representing, targeting specific events (a specific station and a specific event type), a request value of the number of trains per one hour as a number-of-trains condition. The specific station is described as a target station and the specific event type is described as a target event type. A set of the target station and the target event type is described as a current node. The number-of-trains condition is a condition of the number of train lines including time of departure from a first stop position in a first period, time of arrival at the first stop position, or time of pass through the first stop position.

Figure 11:
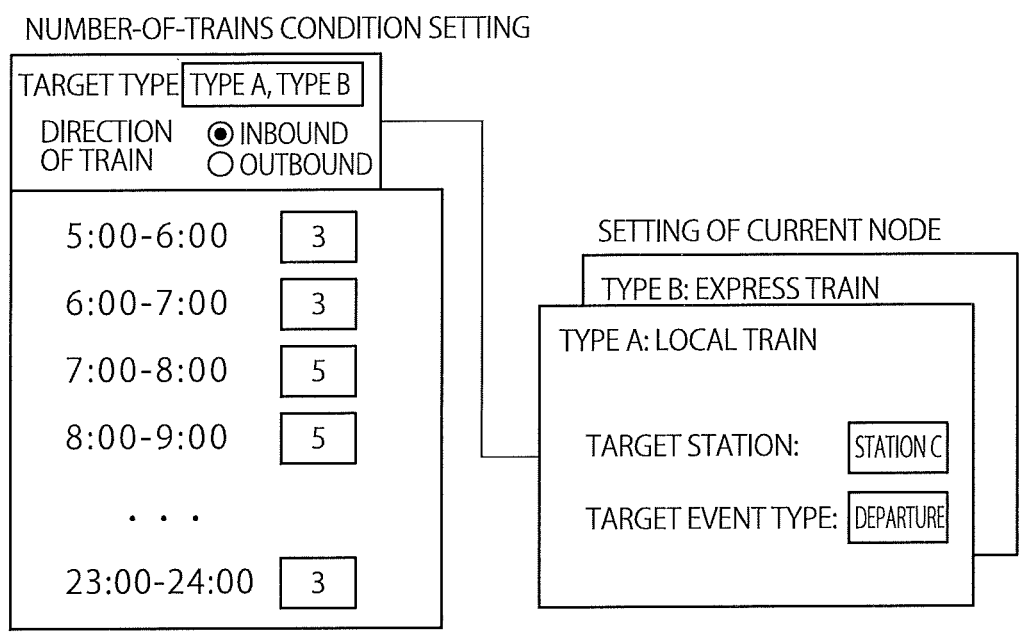
FIG. 11 shows an example of a number-of-trains condition and a setting screen for the number-of-trains condition.

FIG. 11 shows an example of the number-of-trains condition and a setting screen for the number-of-trains condition. The number of trains per one hour is set for the current node (the target station and the target event type) for each of target types (local and express) and each of directions (inbound and outbound). As the target types, both of the local and the express (that is, all trains) are designated on the screen left side. The inbound is designated as the direction. In setting of the current node on the screen right side, stations where the number of trains should be counted are designated concerning all the trains set as the target types on the left side. In the example shown in FIG. 11, for local trains and express trains, it is set that three trains depart the station C at five to six (5:00 to 6:00), three trains depart the station C at six to seven (6:00 to 7:00), three trains depart the station C at seven to eight (7:00 to 8:00), . . . , and three trains depart the station C at twenty-three to twenty-four (23:00 to 24:00). Note that the description such as 5:00 to 6:00 is simple description representing five to six and does not strictly include 6:00 just. The same applies below. The target event type is departure. However, the target event type may be another event type such as arrival or pass. Time periods such as five to six and six to seven correspond to the first period for which the number of train lines is set. The station C corresponds to the first stop position, which is the target station for which the number-of-trains condition is set.

In the example shown in FIG. 11, the setting of the number-of-trains condition is performed in common for both of the local and the express (all the trains). However, for example, the setting of the number-of-trains condition may be performed separately for each of the express trains and the local trains. The number-of-trains condition may be set for only one of the express trains and the local trains. The setting of the number-of-trains condition may be performed for a part of the trains (for example, a part of a plurality of express trains).

Figure 12:
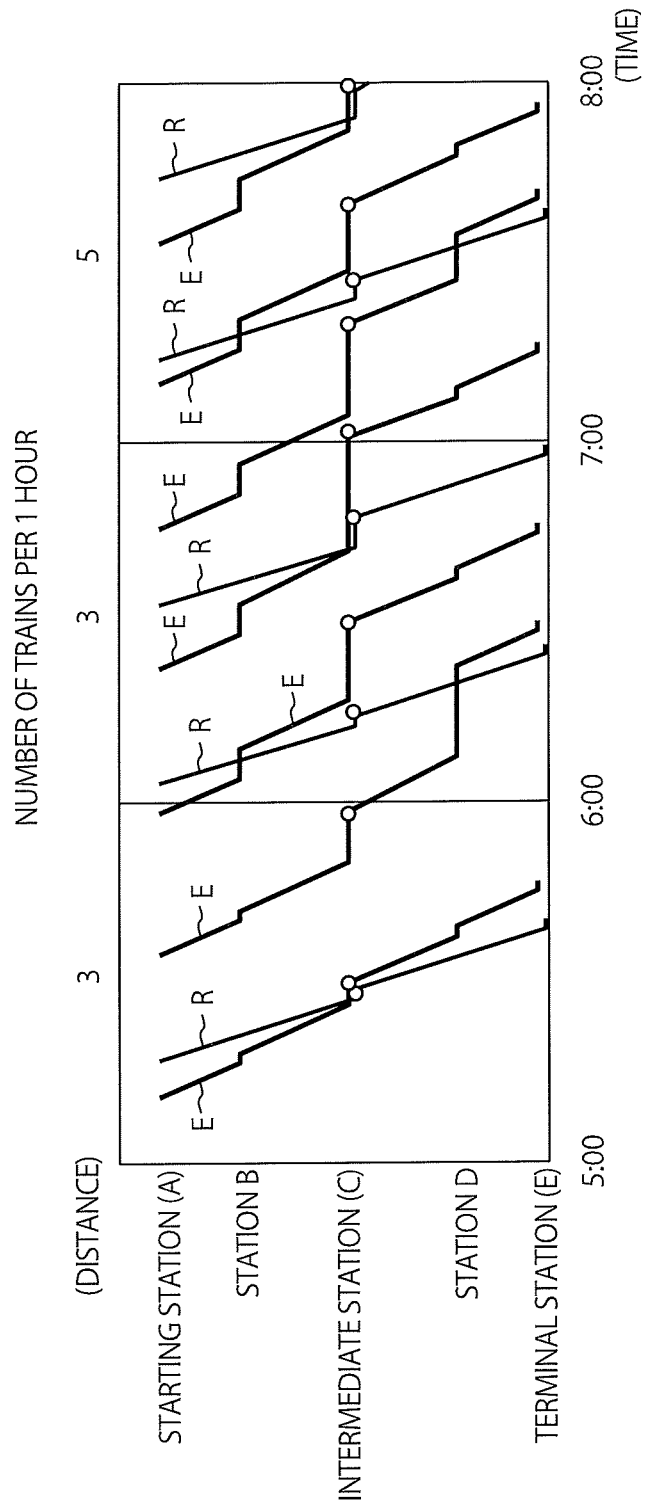
FIG. 12 schematically shows an example of a plurality of train lines satisfying the number-of-trains condition.

An example of a plurality of train lines satisfying the number-of-trains condition will be described below. FIG. 12 schematically shows an example of a plurality of train lines satisfying the number-of-trains condition shown in FIG. 11. All the trains are targets of the setting of the number-of-trains condition. Departure nodes at the station C of all the trains are current nodes. Train lines E represent train lines of local trains. Train lines R represent train lines of express trains. In such a case, nodes indicated by circles painted white are current nodes. Three, three, and five current nodes are respectively present at 5:00 to 6:00, 6:00 to 7:00, and 7:00 to 8:00. It is seen that the number-of-trains condition is satisfied.

The above description is based on the premise that the diagram is given in advance. However, the apparatus 100 may automatically generate, based on the number-of-trains condition decided above, the diagram or the graph information shown in FIG. 6 or 7. In such a case, information relating to departure, arrival, and pass at stations is given for each of types and combined with the decided number-of-trains condition to create a diagram or a graph (nodes and arcs). In creating the diagram or the graph, time intervals among the stations may be decided using the minimum time interval shown in FIG. 8 or a standard time interval may be separately decided and adopted as the time intervals. Overtaking stations and timings of overtake of the trains may be separately decided. By automatically generating the diagram or the graph information in this way, the present embodiment is capable of correcting a diagram given in advance and creating a diagram satisfying the restriction conditions and the various performances described above. Further, the present embodiment is capable of creating a diagram satisfying the restriction conditions and the various performances from the beginning.

The balance condition information 221 is information deciding a condition (a balance condition) relating to restriction of a time interval between train lines. The number of trains set per predetermined time interval can be decided according to the number-of-trains condition. However, intervals among the train lines can be made as uniform as possible by deciding the balance condition. A current node for which an interval is adjusted is, as an example, a current node (a target station and a target event type) for which the number-of-trains condition is set. However, a node different from the node for which the number-of-trains condition is set may be decided as a node to which the balance condition is applied.

Figure 13:
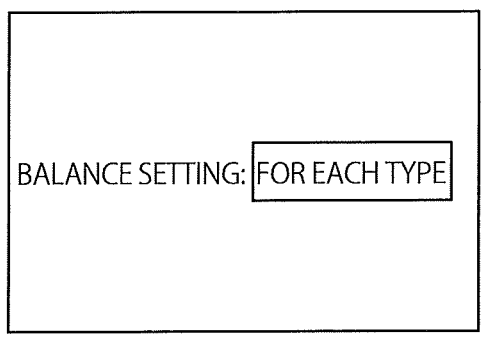
FIG. 13 shows an example of a balance condition and a setting screen for the balance condition.

FIG. 13 shows an example of the balance condition and a setting screen for the balance condition. A target of setting of the balance condition can be optionally defined for each of types, common to all trains, or the like. In the example shown in FIG. 13, the balance condition is set for each of types (local and express). In such a case, this means equalizing intervals among train lines of local trains and equalizing intervals among train lines of express trains. When the target of the setting of the balance condition is set common to all the trains, a method of giving balance restriction means equalizing intervals of all the trains. Besides, various variations are possible, for example, only intervals of a part of types are equalized, only a part of time periods are equalized, and a combination of the foregoing. As described above, the balance condition may be set for a node different from the current node decided under the number-of-trains condition. For example, while a departure event from the station C is set as a target in the number-of-trains condition, not only the departure event from the station C but also a departure event from the station A may be set as a target in the balance condition.

Figure 14:
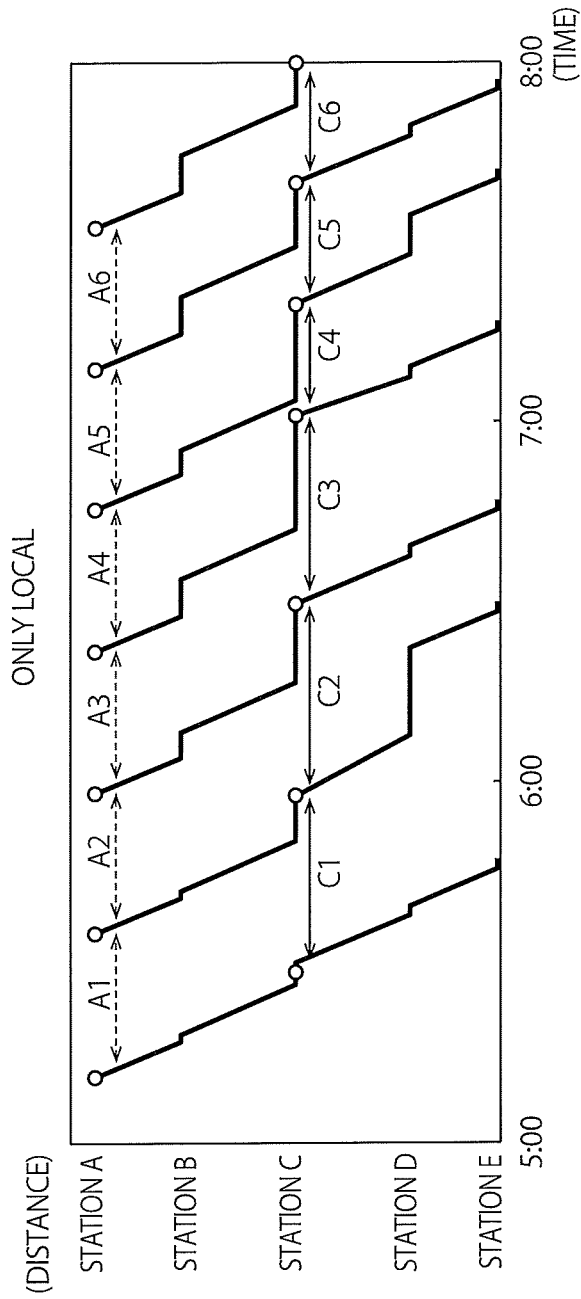
FIG. 14 shows an example in which the balance condition is applied respectively to departure nodes at a station A and departure nodes at a station C of a train (a local train) to generate a plurality of train lines.

FIG. 14 shows an example of a plurality of train lines satisfying the balance condition respectively with respect to departure nodes at the station A and departure nodes at the station C of a train (a local train). In such a case, intervals among the plurality of train lines are adjusted such that adjacent intervals A1, A2, A3, A4, A5, and A6 of the departure nodes at the station A and adjacent intervals C1, C2, C3, C4, C5, and C6 of the departure nodes at the station C are respectively equal to each other as much as possible.

The quick-deliverability evaluation condition input unit 130 acquires quick-deliverability evaluation condition information 230 and stores the acquired information in the storage 113. A specific implementation example of the quick-deliverability evaluation condition input unit 130 is the same as the implementation example of the diagram information input unit 110.

The quick-deliverability evaluation condition information 230 decides a section in which run times (quick-deliverability) of trains are evaluated. As a runtime in a section is shorter, quick-deliverability is higher. The section is specified by, as an example, a start point (an evaluation start point) and an end point (an evaluation end point) of the section. The evaluation start point can be represented by an evaluation start node and the evaluation end point can be represented by an evaluation end node. The evaluation start node is, for example, a departure node at an evaluation start station. The evaluation end node is, for example, an arrival node at an evaluation end station.

Figure 15:
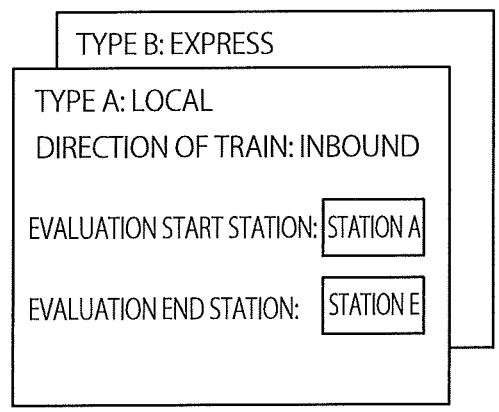
FIG. 15 shows an example of quick-deliverability evaluation condition information and a setting screen for the quick-deliverability evaluation condition.

FIG. 15 is shows an example of a quick-deliverability evaluation condition and a setting screen for the quick-deliverability evaluation condition. An evaluation start station (an evaluation start node) and an evaluation end station (an evaluation end node) are set for each of types (local and express). Another setting method may be a method of setting the evaluation start station and the evaluation end station for each of trains.

The delay evaluation condition input unit 140 acquires delay evaluation target information 240 and delay time distribution information 241 as information for delay evaluation and stores the acquired information in the storage 114. A specific implementation example of the delay evaluation condition input unit 140 is the same as the implementation example of the diagram information input unit 110.

The delay evaluation target information 240 represents a node for which delays of trains are evaluated (a delay evaluation node). The delay evaluation node is represented by a set of an evaluation target station and an event type (departure, arrival, pass, or the like) of an evaluation target.

Figure 16:
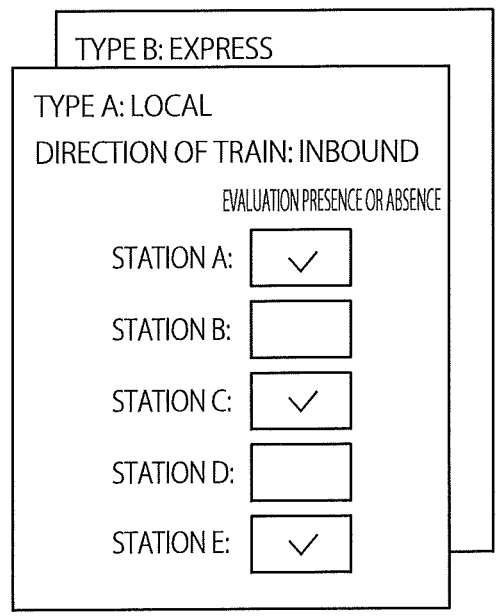
FIG. 16 shows an example of delay evaluation target information and a setting screen for the delay evaluation target information.

FIG. 16 shows an example of the delay evaluation target information 240 and a setting screen for the delay evaluation target information 240. An evaluation target station is given as a checkbox for each of types (local and express) and directions (inbound and outbound). An event type of an evaluation target is designated as departure in advance. However, the event type may be arrival, pass, or the like. A checkbox for designating the event type may be provided. In the example shown in FIG. 16, the station A, which is a starting station, the station C, which is an intermediate station, and a station E, which is a terminal station, are designated as evaluation target stations. Therefore, departure nodes at the station A, the station C, and the station E are designated as evaluation target nodes.

The delay time distribution information 241 is an event-to-event delay distribution, which is a distribution of delay times among events, or information necessary for creating the event-to-event delay distribution. Examples of such information include a parameter of a probability distribution. A parameter with respect to a probability distribution having statistical amounts such as an average, a variance, and a median as parameters may be set as delay time distribution information.

Examples of the event-to-event delay distribution include a geometrical distribution or a negative binomial distribution. Specific examples of the event-to-event delay distribution include a delay distribution of a run time between stations and a delay distribution of a dwell time at a station. The run time corresponds to a time interval from departure time in a previous station (time of a departure event) to arrival time or pass time in the next station (time of an arrival event or time of a pass event). The dwell time corresponds to a time from arrival time at a station (time of an arrival event) to departure time at the station (time of a departure event).

As an example of the event-to-event delay distribution, an example of a probability distribution function using a geometrical distribution will be described. Equation (1) represents a probability distribution function (a discrete distribution) of the geometrical distribution. "D(k)" represents a probability of a delay time being "k". In Equation (1), "k" represents a probability variable and "p" represents a geometrical distribution. The geometrical distribution can be decided as p=1/(x+1), where "x" represents an average of delay times.

[Math 1]

$$D(k)=(1-p)^k p (k=0,1,2,\ldots) \quad (1)$$

In the geometrical distribution, "p" is the only parameter. Therefore, a distribution can be determined simply by giving one statistical value to the parameter.

In FIG. 17, an example of an average of delay times of run times among stations and an example of an average of delay times of dwell times at the stations are shown for each of types (local, express, and the like). When the geometrical distribution is used, a distribution can be decided using such averages as parameters. Different delay time distribution information may be used according to a type of a train. Different delay time distribution information may be used according to a time period (for example, rush hour or not). When a delay is not considered, all delay times among events only have to be set to 0.

FIG. 18 shows an example of a probability distribution using the geometrical distribution as an example of the event-to-event delay distribution. A horizontal axis indicates "k" (the delay time) and a vertical axis indicates "D(k)" (the probability of the delay time being "k"). In this example, a value at which a probability function becomes nonnegative first is k=0. However, the distribution may be shifted to the left or right such that the probability function becomes nonnegative first in a portion where "k" is negative or positive.

As another example of the delay time distribution information 241, a histogram based on a result of delay times may be used. As the histogram in such a case, an operation result may be directly used. The histogram may be a sample generated from some approximate distribution.

The Diagram Processor 500

The diagram processor 500 quickly creates, based on the information stored in the storages 111 to 114, a diagram satisfying, while satisfying a time restriction among events and securing transportation capacity of a train (a density condition), various performances for, for example, enabling passengers to arrive at destinations as early as possible (quick-deliverability), standardizing the diagram (a balance condition), and preventing the diagram from being easily affected by a delay (delay robustness).

The Network Creator 520 of the Diagram Processor 500

The network creator 520 reads out the diagram 210 from the storage 111 and converts the read-out diagram 210 into a network. When the diagram 210 includes a network from the beginning, the conversion is unnecessary.

Figure 19:
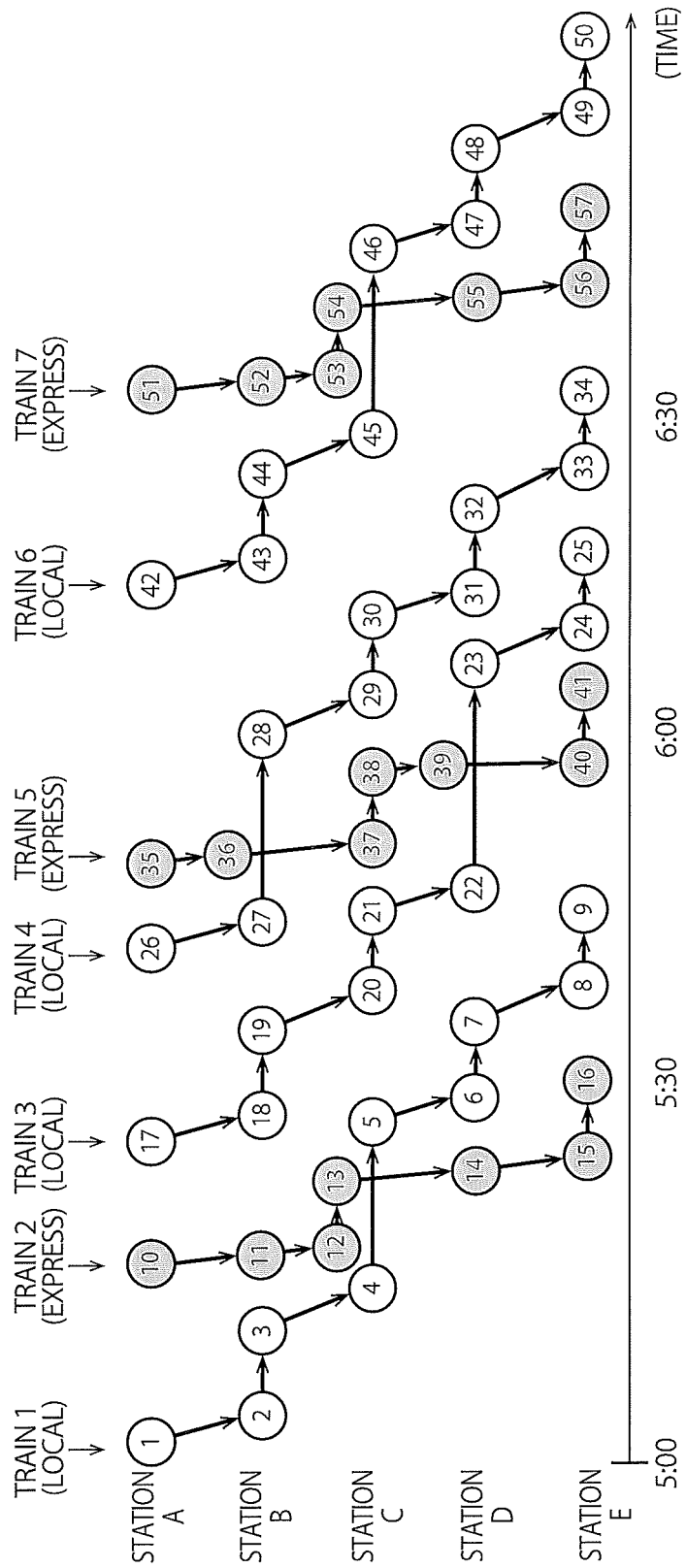
FIG. 19 shows an example of a network into which a diagram is converted.

FIG. 19 shows an example of the network obtained by converting the diagram 210. The following description is based on the network.

The network creator 520 specifies the preceding nodes (the Pnode1 and the Pnode2) (see FIG. 7) of nodes and adds information relating to the specified preceding nodes to the diagram 210. When information relating to the preceding nodes is added to the diagram 210 from the beginning, work for specifying the preceding nodes is unnecessary.

The Block Creator 521

The block creator 521 creates a plurality of blocks, each including one or more nodes, by converting nodes included in the diagram 210 into blocks. A block means a node set obtained by collecting all nodes, times of which have to be shifted by the same time when time of a certain node is shifted by a fixed time. The plurality of blocks can also be considered to be obtained by converting times included in the diagram 210 into blocks.

All the nodes can be freely moved in some cases but are desired to be restrained in other cases. For example, when train lines are represented in a coordinate system in which a horizontal axis indicates time and a vertical axis indicates distance, if an inclination of an arc cannot be changed (speed cannot be changed) during running, a time difference between nodes at both ends of the arc is fixed. For example, a time difference from a departure node $j_1$ at the station A to an arrival node $j_2$ at the station B in a certain section (from the station A to the station B) of a certain train is fixed. In such a case, when time of the departure node $j_1$ is delayed by one minute, time of the arrival node $j_2$ is also delayed by one minute. Therefore, a group of such nodes that cannot relatively move is paired and referred to as block.

For example, an event (a start node) of a stop position of a start of a section in which a train runs without dwelling, an event (an end node) of a stop position of an end of the section, and all events (nodes) present between the start event and the end event are collected in one block. Alternatively, time of departure from the stop position at the start of the section in which the train runs without dwelling, time of arrival at the stop position at the end of the section, and all times present between the times are collected in one block.

At this time, since all the nodes are exclusively included in any block, a node set V is divided into sets b0, b1, . . . , and bB. In the following description, a block to which a node j belongs is represented by b(j).

Figure 20:
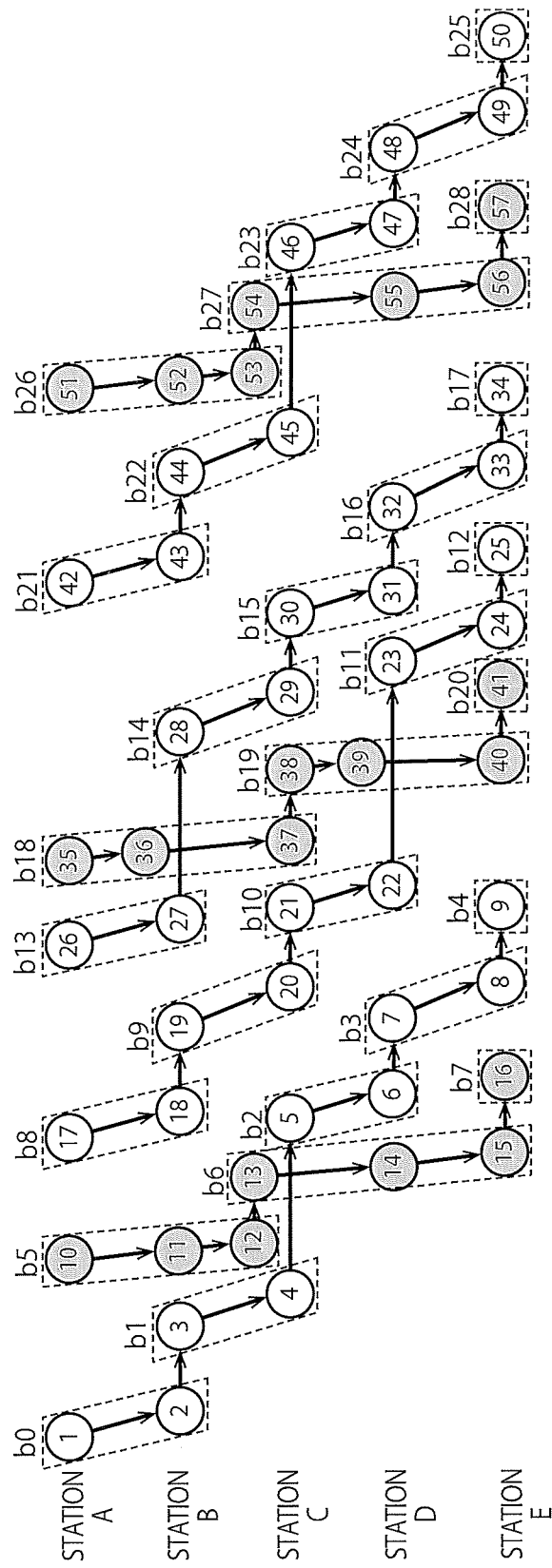
FIG. 20 shows an example of blocks created from a group of nodes shown in FIG. 19.

FIG. 20 shows an example of blocks created from the group of nodes shown in FIG. 19. The group of nodes shown in FIG. 19 is divided into blocks b0, b1, . . . , and b25. For example, it is assumed that moving speed between a node 1 and a node 2 is fixed, a relative position between the node 1 and the node 2 cannot be adjusted. Therefore the node 1 and the node 2 are classified into the same block. On the other hand, the position of a node 3 can be moved within a range of a margin time with respect to the node 2 (that is, a relative position to the node 2 can be adjusted). Therefore, the node 3 is not classified into the same block as the node 2.

The Front-Packed Diagram Creator 522

The front-packed diagram creator 522 creates a fastest diagram under a condition based on a restraint relation among the blocks created by the block creator 521. The diagram is referred to as front-packed diagram 300. The restraint relation among the blocks means that relative positions of nodes in the blocks are not changed. The fastest diagram is a diagram in which time of a last node is the earliest. The front-packed diagram creator 522 stores the front-packed diagram 300 in the storage 115.

Figure 21:
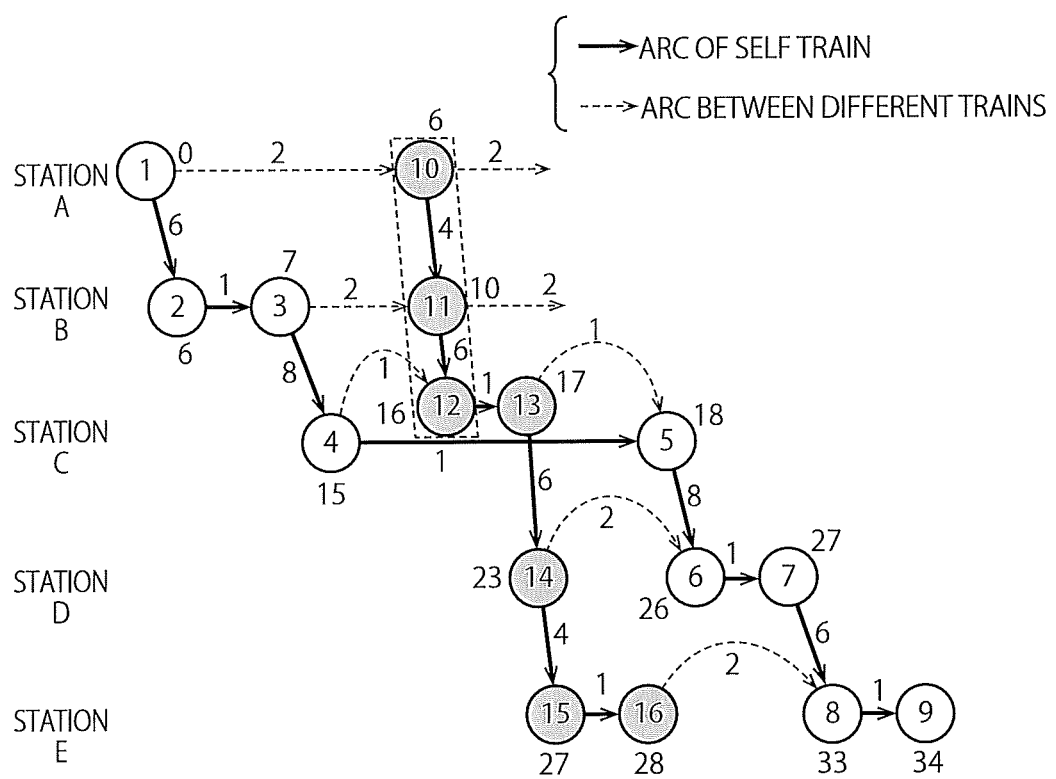
FIG. 21 shows an example of a first portion of a front-packed diagram.

FIG. 21 shows an example of a first portion of the front-packed diagram (a portion of the train 1 and the train 2 of the front-packed diagram). This is created based on the group of blocks shown in FIG. 20 and the event-to-event interval information 211 shown in FIG. 8.

Numbers beside arcs shown in FIG. 21 represent minimum interval times for the arcs shown in the event-to-event interval information 211 shown in FIG. 8. Numbers of bold letters added to the nodes represent times created by the front-packed diagram creator 522. Times of nodes other than the node 1 are represented as relative times (minutes) relative to time of the node 1 at the time when the time of the node 1 is set to 0.

A specific method of creating a front-packed diagram will be described with reference to FIG. 21.

First, time of the first node 1 is set to 0.

Subsequently, concerning the node 2, since the event-to-event interval information 211 of an arc between the nodes 1 and 2 is six, time of the node 2 is 6.

Similarly, time 7 of a node 3, time 15 of a node 4, and the like can be calculated.

Subsequently, concerning nodes 10, 11, and 12 belonging to the block b5 (see FIG. 20), the node 12 having the strictest restriction is determined first in a relation with the immediately preceding node. In such a case, since a minimum interval time of 1 from the node 4 needs to be left with respect to the node 12, time of the node 12 is 16. Based on this node, a relative positional relation in the block b5 cannot be changed. Therefore, time of the node 11 can be calculated as 10 (="time of the node 12"–"a minimum interval time between the nodes 11 and 12"=16–6). Similarly, time of the node 10 can be calculated as 6 (=10–4). The times of the nodes in the block are decided using the minimum interval time. However, time intervals other than the minimum interval time may be used.

Thereafter, times of all nodes can be determined by deciding times in order from nodes belonging to a temporally earlier block. Consequently, a front-packed diagram is created.

Figure 22:
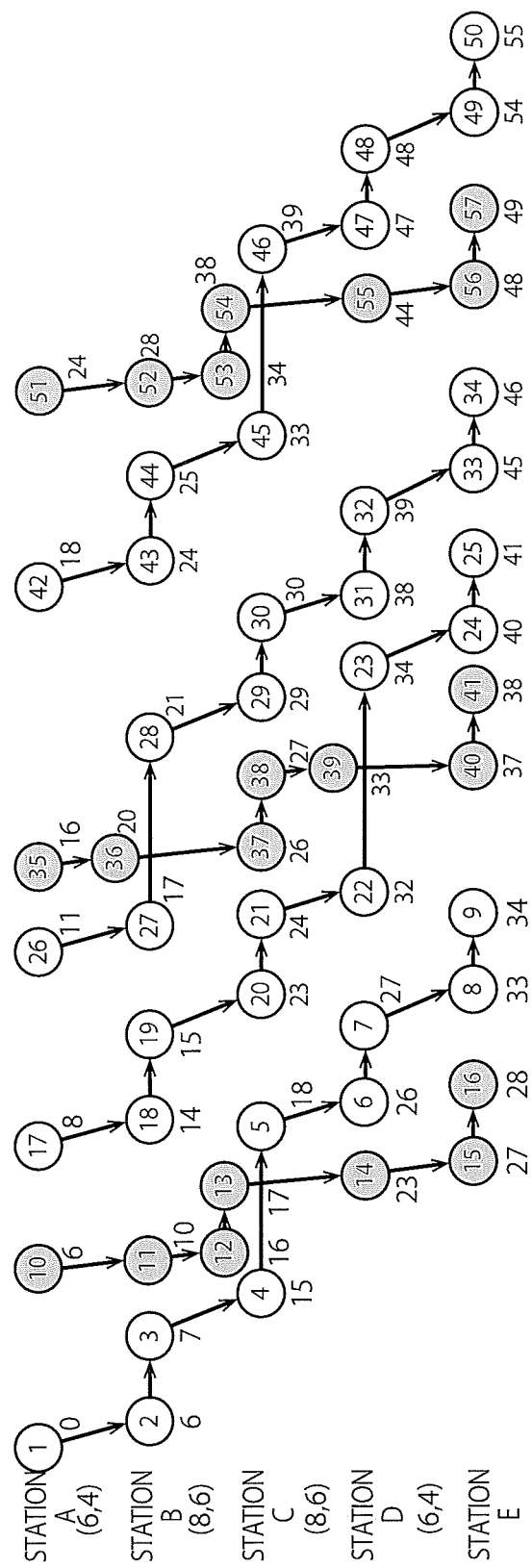
FIG. 22 shows an example of a front-packed diagram in which fastest times of all nodes are determined.

FIG. 22 shows an example of the front-packed diagram in which the times of all the nodes are determined. The blocks and the minimum interval time are not shown in FIG. 22. Values of minimum run times among the stations are shown for each of types (local and express). For example, (6, 4) described between the station A and the station B means that a minimum run time of the local is 6 minutes and a minimum run time of the express is 4 minutes.

In the following description, time of nodes j of the front-packed diagram is represented as "$t^o_j$". In the front-packed diagram, between nodes i and j for which an arc is decided, time difference $t^o_j - t^o_i$ is always equal to or larger than a minimum interval time decided for the arc. Therefore, a margin time (represented as "$M^o_{i,j}$") between the nodes i and j in the front-packed diagram is always nonnegative. "–" represents subtraction.

Figure 23A:
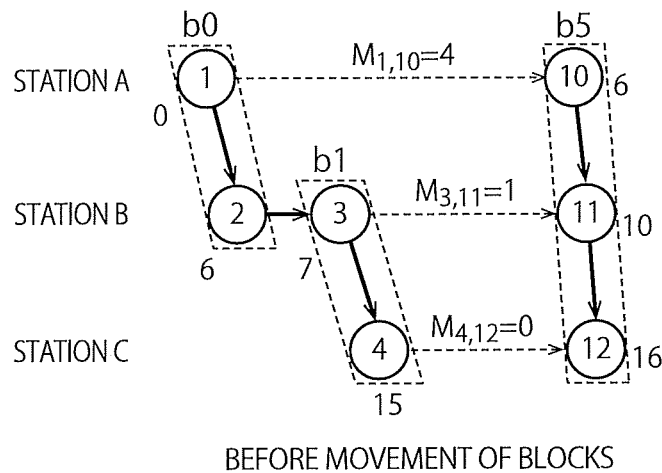
FIGS. 23A and 23B show examples in which margin times are calculated.

FIG. 23A shows an example in which margin times for arcs of a diagram after the conversion into the blocks shown in FIG. 20 are calculated. A difference in time between the node 4 and the node 12 is 1 (=16–15). This is equal to 1 (see FIG. 8), which is a minimum interval time between the node 4 and the node 12. In such a case, a margin time $M^o_{4,\,12}$ is 0(=1–1). A difference in time between the node 1 and the node 10 is 6 (=6–0). This larger than 2 (see FIG. 8), which is a minimum interval time between the node 1 and the node 10. In such a case, a margin time $M^o_{1,\,10}$ is 4(=6–2).

A variable $x_k$ (>=0) is defined for blocks $b_k$ (elements of a set B). The variable $x_k$ indicates by how long time is adjusted with respect to the front-packed diagram in minutes, that is, an adjustment amount of time. When a new diagram obtained by shifting the blocks by the variable $x_k$ with respect to the front-packed diagram is created, time tj of the nodes j in the blocks is calculated as follows:

$$tj = t^o_j + x_{b(j)} \qquad (2)$$

In the above equation, b(j) represents an ID of a block to which the node j belongs, $t^o_j$ represents time of the node j in the front-packed diagram, and $x_{b(j)}$ represents a time interval by which the block to which the node j belongs in the front-packed diagram is shifted (an adjustment amount of time with respect to the block; the adjustment amount is applied in common to the nodes in the block).

A margin time ($M_{ij}$) of an arc between the noes i and j in a diagram created anew is represented by the following equation.

$$M_{ij} M^0{}_{ij} + x_{b(j)} - x_{b(i)} \quad (3)$$

Figure 23B:
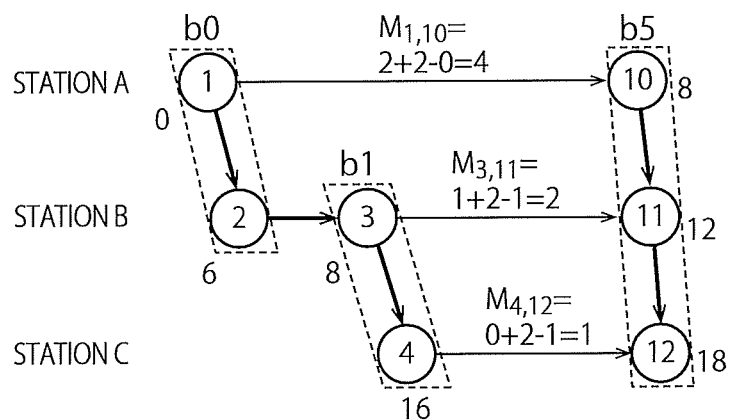

FIG. 23B shows an example of a new diagram obtained as a result of shifting the blocks in the case of $x_0=0$ (the block 0 is not moved), $x_1=1$ (the block 1 is shifted by 1 minute in a positive time direction), and $x_2=2$ (the block 2 is shifted by 2 minutes in the positive time direction) in the state shown in FIG. 23A.

In FIG. 23B, times of the nodes are calculated as follows:

$$t1 = t^0{}_1 + x_0 = 0 + 0 = 0 \quad (4\text{-}1)$$

$$t2 = t^0{}_2 + x_0 = 6 + 0 = 6 \quad (4\text{-}2)$$

$$t3 t^0{}_3 + x_1 = 7 + 1 = 8 \quad (4\text{-}3)$$

$$t4 = t^0{}_4 + x_1 = 15 + 1 = 16 \quad (4\text{-}4)$$

$$t10 = t^0{}_{10} + x_2 = 6 + 2 = 8 \quad (4\text{-}5)$$

$$t11 = t^0{}_{11} + x_2 = 10 + 2 = 12 \quad (4\text{-}6)$$

$$t12 = t^0{}_{12} + x_2 = 16 + 2 = 18 \quad (4\text{-}7)$$

A margin time of an arc is calculated as follows:

$$M_{1,10} = M^0{}_{1,10} + x_5 - x_0 = 2 + 2 - 0 = 4 \quad (5\text{-}1)$$

$$M_{3,11} = M^0{}_{3,11} + x_5 - x_1 = 1 + 2 - 1 = 2 \quad (5\text{-}2)$$

$$M_{4,12} = M^0{}_{4,12} + x_5 - x_1 = 0 + 2 - 1 = 1 \quad (5\text{-}3)$$

The Density Condition Processor 523

The density condition processor 523 derives, for nodes (in the example shown in FIG. 11, nodes having the departure event at the station C) for which the number-of-trains condition is set, a time range (upper limit time and lower limit time) in which the nodes can be disposed.

Figure 24:
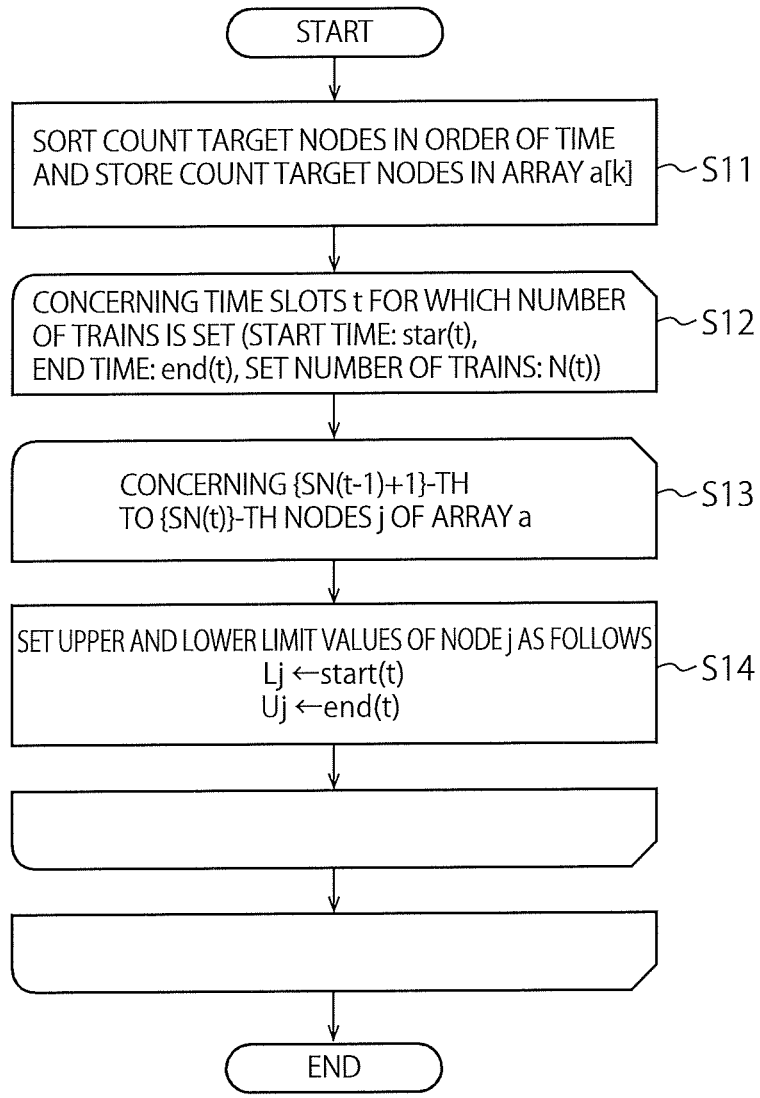
FIG. 24 is a flowchart showing an example of processing of a density condition processor.

FIG. 24 is a flowchart showing an example of processing of the density condition processor 523. In description of the flowchart, nodes for which the number-of-trains condition is set are referred to as count target nodes.

First, in step S11, the density condition processor 523 sorts the count target nodes in time order and stores the count target nodes in a node array "a". "a[k]" represents a k-th node of the node array. The count target nodes may be specified from the diagram 210 stored in the storage 111, may be specified from the network created by the network creator 520, or may be specified from the front-packed diagram 300 created by the front-packed diagram creator 522.

Subsequently, the density condition processor 523 selects, for each of time periods (time slots (t)) for which the number-of-trains condition is set (step S12), from a node array, a node allocated to the time slot (t) preferentially from a node earlier in time by a number of trains N(t) (step S13). The density condition processor 523 performs processing for setting start time start(t) of the time slot (t) to lower limit time Lj with respect to the selected N(t) nodes j and setting end(t) representing end time of the time slot (t) to upper limit time Uj (S14).

A specific example will be described. In the example shown in FIG. 19 described above, when the count target nodes are nodes of the intermediate station (the station C) of the local, an array of the nodes are [13, 5, 21, 38, 30, 54, 46, . . . ].

It is assumed that the number of trains per one hour is decided as [3, 3, 5, . . . ] in the order of five to six (=a time slot (5)), six to seven (=a time slot (6)), and seven to eight (=a time slot (7)) (see FIG. 11) and start (5)=5:00, end (5)=5:59, start (6)=6:00, end (6)=6:59, start (7)=7:00, end (7)=7:59, and so on. At this time, first three (13, 5, and 21) of the node array are allocated to five to six, the next three (38, 30, and 54) are allocated to six to seven, and so on. As a result, the lower limit time Lj and the upper limit time Uj of the nodes of the node array are as follows. The lower limit time Lj and the upper limit time Uj are calculated in the same manner for the node 46 and the subsequent nodes.

L13, L5, L21=5:00, U13, U5, U21=5:59
L38, L30, L54=6:00, U38, U30, U54=6:59

In this way, the number-of-trains condition can be represented by a set of the lower limit Lj and the upper limit Uj of the times of the nodes j. For example, Lj=–∞ and Uj=∞ are set for nodes for which the number-of-trains condition is not set.

The Evaluation Indicator Creator 524

The evaluation indicator creator 524 creates evaluation indicators respectively relating to standardization (a balance condition), quick-deliverability, and delay robustness. In optimization processing described below, a weighted sum of the evaluation indicators is represented as an evaluation indicator (a general indicator).

In the above description, $x_k$ (>=0) is defined as the variable representing the time by which the block $b_k$ is shifted (delayed). As a variable representing an expected value of a shift time of the nodes j, $\mu_j$ is defined. A delay in an arc is referred to as primary delay and a delay in a node caused by the delay in the arc is referred to as secondary delay. The expected value of the delay time of the node j is an expected value of a secondary delay time.

As described below, it is assumed that a delay simulation by S scenarios (s=1, 2, . . . , and S) for giving different primary delay times to arcs is performed. The magnitude of a secondary delay in the scenario s of the node j is represented as "$y^s_j$". In such a case, the expected value $\mu_j$ of the delay time of the node j is an average of secondary delay times $y^s_j$ of the scenarios s. The expected value $\mu_j$ is represented as follows:

[Math 2]

$$\mu_j = \frac{1}{S} \sum_{s \in S} y^s_j \quad (6)$$

|S|=1 is equivalent to performing the delay simulation once.

In the following description, a formula of an evaluation indicator is created using the variable $x_k$ and the variable $\mu_j$. An evaluation indicator for standardization (an evaluation indicator for the balance condition)

First, an evaluation indicator for standardization of a diagram (an evaluation indicator for satisfying the balance condition) will be described.

As described with reference to FIG. 14, the balance condition of the diagram is represented based on a difference (represented as "D") between a time difference of time of a certain node from time of the preceding node and a time difference of the time of the node from time after the node. Therefore, the following Equation (7) only has to be calculated concerning all departure nodes departing from a certain station (in the example shown in FIG. 14, the station C and the station A) and minimized.

$$D = [\text{departure time of the next node–departure time of the present node}] - [\text{departure time of the present node–departure time of the preceding node}] \quad (7)$$

When the next node is represented as "n(j)" and the preceding node is represented as "p(j)", departure times of the present node, the next node, and the preceding node are represented as follows:

$$\text{Departure time of the present node} = t^0_j + x_{b(j)} \quad (7)$$

$$\text{Departure time of the next node} = t^0_{n(j)} + x_{b(n(j))} \quad (8)$$

$$\text{Departure time of the preceding node} = t^0_{p(j)} + x_{b(p(j))} \quad (9)$$

Consequently, minimization of the evaluation indicator for standardization is represented by the following equation. In the equation, $z_j$ represents a variable representing an upper limit value of the absolute value of the difference D.

[Math 3]

[Math 3]

$$\min\left\{\sum_{j \in V_B} z_j\right\} \text{ s.t. } -z_j \le \left[t^0_{n(j)} + x_{b(n(j))}\right] + \left[t^0_{p(j)} + x_{b(p(j))}\right] - 2 \cdot \left[t^0_j + x_{b(j)}\right] \le z_j, \forall j \in V_B \quad (10)$$

In this way, an evaluation indicator (a first evaluation indicator) relating to standardization of an interval of an event (a second event) relating to a station (a second stop position) set as an evaluation target is created based on the variable $x_{b(j)}$ representing the adjustment amount of the times of the nodes (events). Minimization of the evaluation indicator is formulated. The second event corresponds to the departure nodes at the stations A and C in the example described above. The first evaluation indicator represents a sum of the absolute values of differences D between differences in time between the second event and the preceding events of the second event and differences in time between the second event and the next events of the second event.

In other words, the first evaluation indicator is an indicator relating to standardization of an interval of time of departure from the second stop position, time of arrival at the second stop position, or time of pass through the second stop position. In such a case, the first evaluation indicator represents a sum of the absolute values of differences between a time difference A and a time difference B. The time difference A is a difference between the time of departure from the second stop position, the time of arrival at the second stop position, or the time of pass through the second stop position and time of departure from the preceding stop position of the second stop position, time of arrival at the preceding stop position, or time of pass through the preceding stop position. The time difference B is a difference between the time of departure from the second stop position, the time of arrival at the second stop position, or the time of pass through the second stop position and time of departure from the next stop position of the second stop position, time of arrival at the next stop position, or time of pass through the next stop position.

Evaluation Indicator for Quick-Deliverability

The evaluation indicator for quick-deliverability of a diagram is represented as a sum of required times of train lines as follows:

[Math 4]

$$\text{Quick-deliverability of a diagram} = \Sigma_{train\ lines}\ \text{time of an arrival node at a terminal station+delay time of the arrival node at the terminal station–time of a departure node at a starting station–delay time of the departure node at the starting station} \quad (11)$$

Minimization of Equation (11) will be considered. A value of the minimization can be represented by the following equation using the variable $x_b$ and the variable $\mu_j$. $V_S$ and $V_F$ respectively represent a first node set and a last node set of a train line. As described above, $x_{b(j)}$ represents a time interval by which a block to which the node j belongs is shifted (delayed).

[Math 5]

$$\min\left\{\sum_{j \in V_F} t^0_j + x_{b(j)} + \mu_j\right\} - \left\{\sum_{j \in V_S} t^0_j + x_{b(j)} + \mu_j\right\} \quad (12)$$

In this way, the evaluation indicator (the second evaluation indicator) relating to a sum of run times in evaluation sections of at least one train line is created. Minimization of the evaluation indicator is formulated. In the example described above, the evaluation sections are the starting station and the terminal station. However, the evaluation section can be optionally set as an evaluation start station and an evaluation end station (see FIG. 15).

Evaluation Indicator for Delay Robustness

Lastly, the delay robustness of a diagram represents difficulty of being affected by a delay. For example, an evaluation indicator for the delay robustness can be represented by the following equation. A current node (an evaluation node) is a node for which a delay is evaluated (see FIG. 16). The current node is, for example, a departure node (a departure event) at a station to be evaluated.

[Math 6]

$$\text{Delay robustness} = \sum_{current\ node} \text{average of secondary delay time of nodes} \quad (13)$$

Minimization of a value of Equation (13) will be considered. A value of the minimization can be represented using $\mu_j$. That is, the value can be represented as follows with a set of evaluation nodes represented as "$V_E$".

[Math 7]

$$\min \sum_{j \in V_E} \mu_j \quad (14)$$

Besides, for example, a probability of a delay equal to or longer than a fixed time may be set as the evaluation indicator considering dispersion of delay times as well.

In this way, an evaluation indicator (a third evaluation indicator) relating to a delay time of an event (a third event) at a station (a third dwell station) set as an evaluation target is created based on distribution information of delay times among a plurality of events. Minimization of the third evaluation indicator is formulated. The third evaluation indicator represents, as an example, a sum of averages of delay times of the third event (see Equation 13), In other words, the third evaluation indicator is an indicator for evaluating a delay time with respect to time of departure from the third stop position, time of arrival at the third stop position, or time of pass through the third stop position. In such a case, the third evaluation indicator represents a sum of averages of delay times with respect to the time of departure from the third stop position, the time of arrival at the third stop position, and the time of pass through the third stop position.

The Optimizer 525

The optimizer 525 creates an objective function (an evaluation function) defined by the weighted sum of the evaluation indicators created by the evaluation indicator creator 524 and one or more restriction conditions including a restriction condition relating to an interval of a plurality of train lines and minimizes the objective function to satisfy the restriction condition to calculate an optimum solution or a quasi-optimum solution of a variable ($x_{b(j)}$, $\mu_j$, or the like). The optimizer 525 stores a calculated value (adjustment amount) of the variable in the storage 116.

An example of the objective function created by the optimizer 525 is shown in Equation (15). Equations (16) to (21) are examples of restriction conditions.

[Math 8]

$$\min \lambda_1 \cdot \left\{ \sum_{j \in V_F} \{t_j^0 + x_{b(j)} + \mu_j\} - \sum_{j \in V_S} \{t_j^0 + x_{b(j)} + \mu_j\} \right\} + \lambda_2 \cdot \left\{ \sum_{j \in V_E} \mu_j \right\} + \lambda_3 \cdot \left\{ \sum_{j \in V_B} z_j \right\} \quad (15)$$

$$\text{s.t. } \mu_j = \frac{1}{S} \sum_{s \in S} y_j^s, \forall j \in V \quad (16)$$

$$M_{i,j} = x_{b(i)} - x_{b(j)} + M_{i,j}^0, M_{i,j} \geq 0, \forall (i, j) \in A \quad (17)$$

$$y_j^s \geq 0, \forall s \in S, \forall j \in V \quad (18)$$

$$y_j^s \geq y_i^s + d_{i,j}^s - M_{i,j}, \forall s \in S, \forall j \in V, \forall i \in prev(j) \quad (19)$$

$$L_j \leq t_j^0 + x_{b(j)} \leq U_j, \forall j \in V \quad (20)$$

$$-z_j \leq [t_{n(j)}^0 + x_{b(n(j))}] + [t_{p(j)}^0 + x_{b(p(j))}] - 2 \cdot [t_j^0 + x_{b(j)}] \leq z_j, \forall j \in V_B \quad (21)$$

The variables are defined as follows. All the variables are nonnegative continuous variables. However, suffixes "b", "s", and "j" are respectively defined on sets B, S, and V.

$y_j^s$: The magnitude of a time of a secondary delay in the scenario s of the node j.

$\mu_j$: An average of secondary delays of the node j.

$x_b$: The magnitude (>=0) of a time interval by which the block b is shifted from the front-packed diagram. This time interval is referred to as shift value or adjustment amount. Since the node j belongs to the block b(j), a time by which the node j is delayed is given by "$x_{b(j)}$".

$z_j$: An upper limit value of the absolute value of the difference D. That is, an upper limit value of a difference between a time difference of the node j from time of the preceding node and a time difference of the node j from time of the following node (a degree of imbalance of the preceding and following nodes).

$M_{i,j}$: A margin time for an arc (i, j)

Constants are Defined as Follow:

V={1, 2, . . . , V} represents a set of nodes. "$V_S$" represents a set of starting station nodes, "$V_F$" represents a set of terminal station nodes, "$V_E$" represents a set of nodes (evaluation nodes) for which a delay is evaluated, and "$V_B$" represents a set of nodes desired to be standardized (nodes to be targets of the balance condition).

A: A set of arcs; "prev(j)" represents a set of nodes having time before time of the node j.

B: A set of suffixes of the variable x; the variable x is sometimes referred to as shift variable (buffer variable) x as well. p S={1, 2, . . . , S} is a set of scenarios.

$d_{i,j}^s$: A primary delay time with respect to an arc between node i and j in the scenario s.

$L_j$: Lower limit time of the node j.

$U_j$: Upper limit time of the node j.

b(j): An ID of a block to which the node j belongs.

p(j): An ID of a node of the same station as the node j, that is, a departure node (or pass) node in a preceding train line.

n(j): An ID of a node same as the same station as the node j, that is, a departure (or pass) node of the next train line.

$a_0(j)$: Fastest time of the node j (time of the node j in the front-packed diagram).

$M_{i,j}^0$: A margin time for the arc (i, j) in the front-packed diagram.

$\lambda_1$, $\lambda_2$, $\lambda_3$: Weights of evaluation indexes given in advance.

In the following description, delay times of the arcs (i, j) are given as values $d_{i,j}^s$ different for each of the S scenarios (s=1, 2, . . . , and S). The value $d_{i,j}^s$ is generated according to an event-to-event delay distribution (for example, the geometrical distribution shown in FIG. 18). A distribution of a secondary delay time obtained as a result of the generation of the value $d_{i,j}^s$ will be considered. That is, considering a plurality of times of scenarios s, an average of a secondary delay in the scenarios s is represented as "$\mu_k$". Equation (16) indicates that an average delay time $\mu_j$ of the nodes j is given by an average of the secondary delay times $y_j^s$ of the scenarios s. A margin time given the arc between the nodes i and j is given by Equation (17) as described above.

Equations (18) and (19) are equivalent to processing for obtaining secondary delay times of the nodes in the simulation of the scenario s. A primary delay time with respect to the arc between the nodes i and j in the scenarios s is represented as "$d_{i,j}^s$". At this time, the secondary delay times of the nodes j are represented as follows using a secondary delay time of the immediately preceding node i (an element of prev(j)) joined to the node j, a primary delay time $d_{i,j}$ generated between the nodes i and j, and a margin time $M_{i,j}$.

[Math9]

$$y_j = \max\{0, \max[y_i + d_{i,j} - M_{i,j}]_{i \in prev(j)}\} \quad (22)$$

Equation (22) is applied in order from the first node. As a result, secondary delay times $y_j^s$ of all the nodes can be obtained. The above is represented by a linear equality as Equations (18) and (19).

Figure 25:
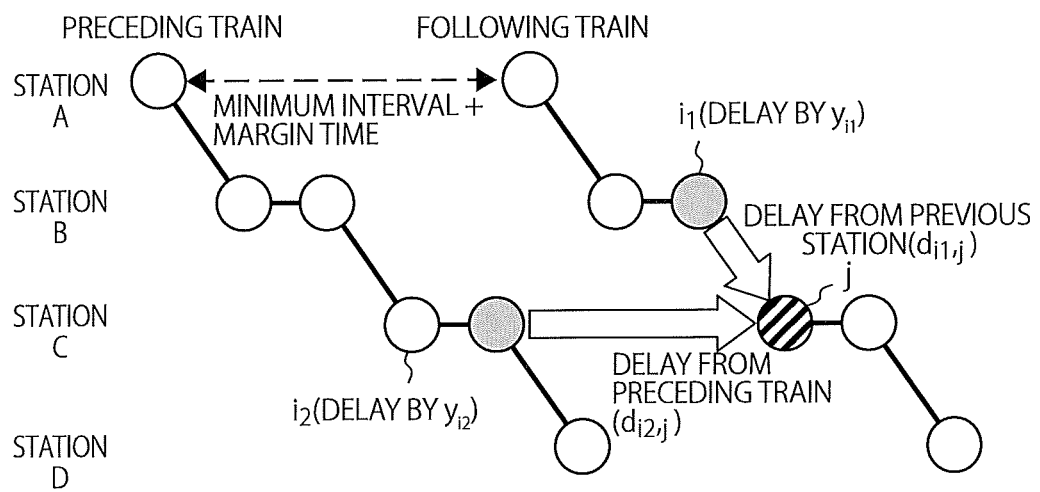
FIG. 25 is a diagram for describing calculation of a secondary delay time of a node.

FIG. 25 is a diagram for describing calculation of a secondary delay time of the node j. When a certain node j is affected by delays of two nodes, that is, a preceding node $i_1$ of the self train and a preceding node $i_2$ of the preceding train, delay time from the preceding node $i_1$ of the self train is represented as "$y_{i1} + d_{i1,j} - M_{i1,j}$" (a time exceeding a margin time $M_{i1,j}$ is a delay time). A delay time of the node j from the preceding node $i_2$ of the preceding train is represented as "$y_{i2}+d_{i2,j}-M_{i2,j}$" (a time exceeding a margin time $M_{i2,j}$ is a delay time). Since large values of the delays are propagated, a maximum value among the values only has to be selected (a max function on the inner side in Equation (22)). Further, usually, departure earlier than predetermined time is not allowed in a diagram. Therefore, a larger value of the selected value and 0 only has to be selected (a max function on the outer side in Equation (22)). The selected value only has to be considered "$y_j$".

Equation (20) gives upper limit times and lower limit times of blocks as restrictions. "$L_j$" and "$U_j$" in this equation are values representing upper and lower limit values of times of nodes calculated based on the number-of-trains condition. Equation (20) is a restriction condition based on the number-of-trains condition and is an example of a restriction condition relating to an interval of a plurality of train lines.

Lastly, Equation (21) is an inequality for the standardization described above (for satisfying the balance condition).

Mathematical programming models represented by Equations (15) to (21) described above are linear programming and can be solved by using a mathematical programming solver such as Gurobi Optimizer or CPLEX. The mathematical programming models may be solved using a meta-heuristic method such as GA (Genetic Algorithm) or SA (Simulated Annealing). As a result, an optimum solution or a quasi-optimum solution relating to "$x_{b(j)}$", "$\mu_j$", and "$z_j$" can be calculated. Calculated $x(x_{b(1)}, x_{b(2)}, x_{b(3)}, \ldots)$ represents a shift value of the nodes j with respect to the front-packed diagram.

The optimizer 525 stores the calculated variable $x(x_{b(1)}, x_{b(2)}, x_{b(3)}, \ldots)$ in the storage 116 as shift information. The optimizer 525 may store a variable $\mu$ ($\mu_1, \mu_2, \mu_3, \ldots$) in the storage 116 in addition to the variable x. The optimizer 525 may store a value of a variable z ($z_1, z_2, z_3, \ldots$) in the storage 116.

The Output Diagram Creator 390

The output diagram creator 390 creates an output diagram 510 based on the shift values (the adjustment amounts) $x_{b(j)}$ of the nodes stored in the storage 116 and the front-packed diagram 300 stored in the storage 115. The output diagram 510 is obtained by adding the shift values $x_{b(j)}$ of the nodes to the times of the nodes j in the front-packed diagram 300. This is equivalent to moving (delaying) the nodes in the front-packed diagram 300 along the time axis by the shift values $x_{b(j)}$ of the nodes. Shift values of nodes belonging to the same block are the same. In the example shown in FIG. 20 described above, the shift value $x_{b(1)}$ of the node 1=the shift value $x_{b(2)}$ of the node 2. This is equivalent to a shift value of a block b0 (a block with a block ID=0).

FIG. 26 is data representing a process for obtaining the output diagram 510. The data includes a node ID, a train line ID, time, a station, fastest time, a block ID, a shift value, and time after shift (time after adjustment). The fastest time is time of a node in the front-packed diagram. The block ID is an ID of a block to which the nodes belong. The shift value is a shift value of the block to which the nodes belong. The time after shift is time obtained by adding the shift value to the fastest time.

Figure 27:
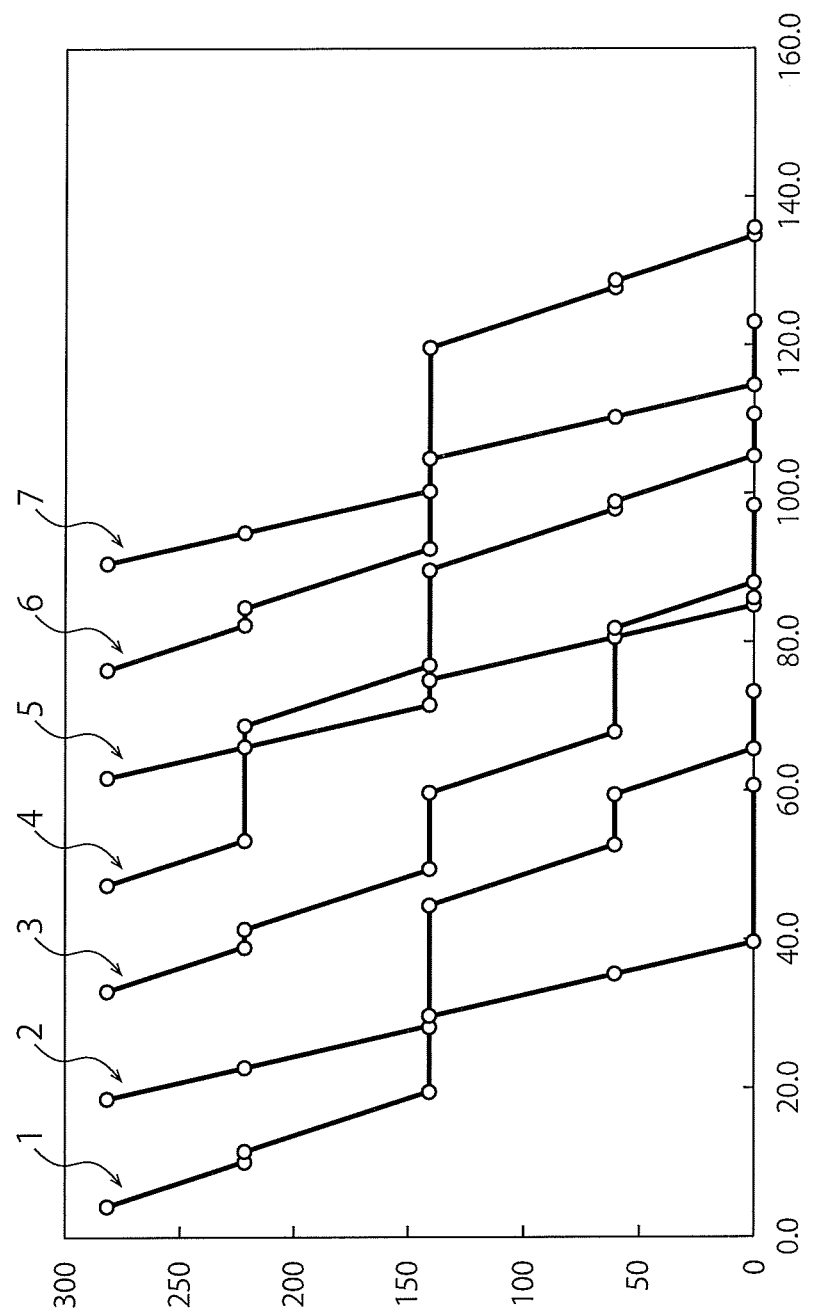
FIG. 27 shows an example of a graph of an output diagram.

FIG. 27 is a graph in which train lines of trains in the data shown in FIG. 26 are plotted with a horizontal axis indicating time and a vertical axis indicating station. The graph is drawn using the time after shift as positions of the nodes. The graph corresponds to the output diagram 510. Information (for example, the node ID, the train line ID, the time, the station, the type, and the time after shift) necessary as a diagram extracted from the data of FIG. 26 may be used as the output diagram 510. In the output diagram 510, the balance condition, the quick-deliverability, the delay robustness, the number-of-trains condition, and the like are satisfied. In the following description, the output diagram in which the balance condition, the quick-deliverability, the delay robustness, the number-of-trains condition, and the like are satisfied will be described using another specific example.

Figure 28:
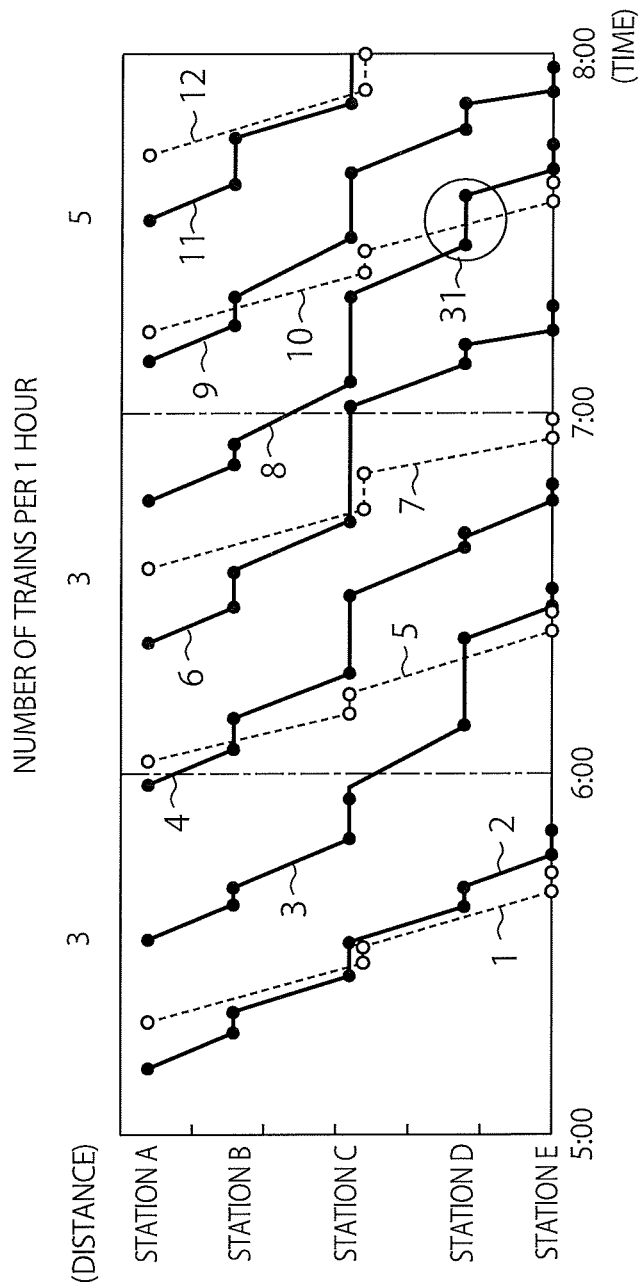
FIG. 28 shows an example of a graph of another output diagram.

FIG. 28 is a graph showing the output diagram 510 created for a diagram according to an example different from the example shown in FIG. 26. A departure station of trains (train lines) 1 to 12 is the station A and a terminal station of the trains (the train lines) 1 to 12 is the station E. Train lines indicated by solid lines represent train lines of local trains. Train lines indicated by broken lines represent train lines of express trains.

In this example, as the number-of-trains condition (the number of trains per one hour), three trains are designated at 5:00 to 6:00, three trains are designated at 6:00 to 7:00, three trains are designated at 7:00 to 8:00, and so on for departure nodes at the station C. In the output diagram 510 shown in FIG. 28, at 5:00 to 6:00, three trains in total, that is, two local trains and one express train are included. At 6:00 to 7:00, three trains in total, that is, one local train and two express trains are included. At 7:00 to 8:00, three local trains and two express trains are included. Accordingly, the number-of-trains condition is satisfied.

In this example, the balance condition is set for each the types (local and express) for departure nodes at the station C and departure nodes at the station A. In the departure nodes at the station A, intervals of local trains are generally equal and intervals of express trains are also generally equal. In the departure nodes at the station C, intervals of local trains are generally equal and intervals of express trains are also generally equal. Accordingly, the balance condition is satisfied. Since the balance condition is not set between the local trains and the express trains, for example, the departure nodes at the station C of the local trains and the departure nodes at the station C of the express trains may be close to each other.

In this example, times of the nodes are optimized such that a delay less easily occurs (the times do not exceed or less easily exceed the margin time). The delay robustness is also satisfied. For example, in parts indicated by black circles, even if the express train 9 passes through the station D later than time of the diagram, the local train 8 can depart from the D station within the margin time. Therefore, a delay does not occur or less easily occurs.

In this example, schedules of the trains are optimized such that the trains reach sections from staring stations to terminal stations as fast as possible. Therefore, the quick-deliverability is also satisfied.

A form of the output diagram 510 is not limited to the example shown in FIG. 27 or FIG. 28. For example, a method of outputting the output diagram 510 for a part of trains and stations such as stations of interest (for example, terminal stations or junction stations) may be adopted. A method of outputting the output diagram 510 for a part of trains and stations set by the user may be adopted. The output diagram 510 may be represented in the form of a table including attributes for each of nodes. The output diagram 510 may be data equivalent to the form of a table. Concerning the indicators such as the delay robustness, the quick-deliverability, and the balance condition, representative values of the entire diagram, values for each of the trains, and the like may be displayed.

According to the processing described above, the output diagram 510 satisfying the restriction condition or the various performances is finally obtained. The display 400 displays the output diagram 510. The display 400 may display the variable x ($x_{b(1)}$, $x_{b(2)}$, $x_{b(3)}$, ...). The display 400 may display the variable $\mu$ ($\mu_1$, $\mu_2$, $\mu_3$, ...). The display 400 may display the variable z ($z_1$, $z_2$, $z_3$, ...).

The display 400 may display statistical values such as a delay distribution or an expected delay time of a relevant event, a probability of a delay in X minutes or more, an expected value and dispersion of a delay time, and an X percentile value of a delay time.

These statistical values can be calculated by regarding delay times $y^s_j$ in scenarios as histograms of delay times. Values of the balance condition, the quick-deliverability, and the delay robustness represented by the terms of Equation (15) may be output. Units of these values are minute. The user can intuitively understand the values.

When additional input information is obtained, output information described below may be obtained by combining the input information with the obtained output diagram.

In a certain train and a certain station (or a plurality of trains and a plurality of stations), when penalty cost of C yen occurs when the train delays Y minutes, an expected value of the penalty cost due to the delay. The expected value can be calculated by regarding the delay times $y^s_j$ in the scenarios as histograms of delay times.

When an OD (a statistical value of origin and destination stations) of passengers is used, an expected value of the number of people affected by the delay. The expected value can also be calculated by using the delay times $y^s_j$.

The output may be output for, rather than showing the entire output diagram, showing only a part of the output diagram and calculating and displaying the indicators for the part. As a method of extracting the part, extraction of a specific section, a specific time period, a specific train (group of trains), a combination of the foregoing, or the like is conceivable.

Figure 29:
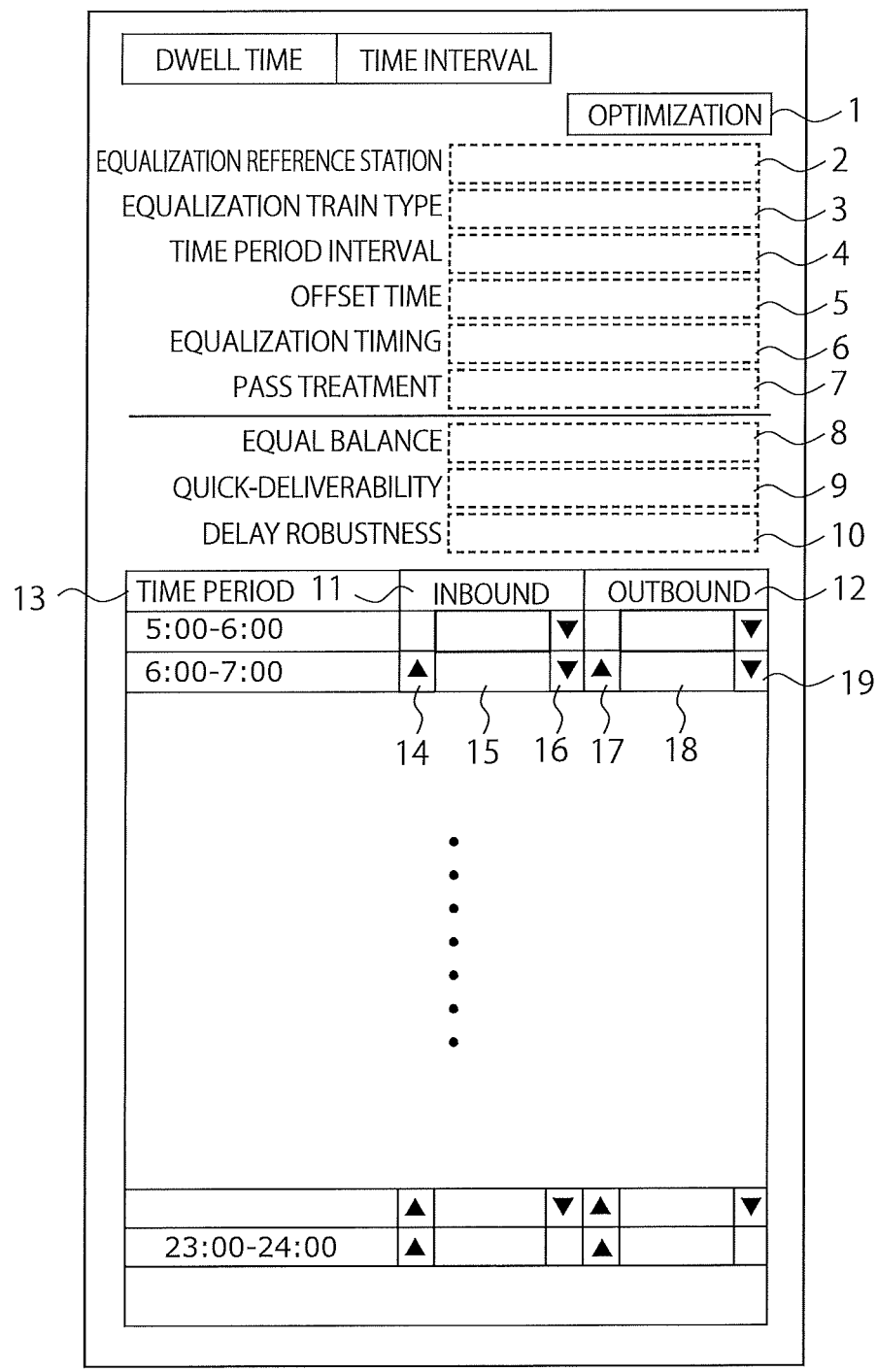
FIG. 29 shows an example of an input interface screen for parameters for optimization processing.

FIG. 29 shows an example of a screen for inputting parameters relating to the number-of-trains condition, the standardization (the balance condition), the quick-deliverability, and the delay robustness and executing optimization.

Pulldown lists 2 to 7 shown in FIG. 29 are pulldown lists for performing setting of a reference node $V_B$, which is a current node of the standardization (the balance condition) and the number-of-trains condition and setting of a time period. The user performs the setting by the pulldown lists using input means. In the pulldown list 2, the user selects a reference station for the standardization and the number-of-trains condition.

In the pulldown list 3, the user selects a train type. The user can select a type out of listed train type names already registered. A default value is, as an example, "all" representing all types.

In the pulldown list 4, the user selects width of a time period to be standardized. The user can select, for example, "3 hours", "2 hours", "1 hour", "30 minutes", and the like. A default value is, as an example, "1 hour".

In the pulldown list 5, the user selects an offset interval of the time period selected in the pulldown list 4. The offset interval represents how much start time of the time period is shifted from predetermined start time (for example, 5:00). A default value is, as an example, 0 minute. When the time period selected in the pulldown list 4 is 30 minutes, the user can select values such as "0 minute", "10 minutes", "15 minutes", and "20 minutes". When the selected time period is 1 hour, the user can select values such as "0 minute", "15 minutes", "30 minutes", and "45 minutes".

In the pulldown list 6, the user selects timing when the reference station selected in the pulldown list 2 is set as a target of the standardization and the number-of-trains condition. The user can select, for example, "departure time" or "arrival time". A default time is, as an example, "departure time".

In the pulldown list 7, the user sets whether pass through the reference station is included as a target of the standardization or a target of counting of the number of trains in the number-of-trains condition. As an example, the user can select "not consider pass" and "consider pass". A default value is, as an example, "not consider pass".

The pulldown lists 8, 9, and 10 are pulldown lists for setting the evaluation indicators ($\lambda_1$, $\lambda_2$, and $\lambda_3$). As described above, $\lambda_1$, $\lambda_2$, and $\lambda_3$ are the weights relating to the respective evaluation indicators: the standardization (the balance condition), the quick-deliverability, and the delay robustness.

The user can select, for example, "standard" (for example, 1.0), "attach importance" (for example, 10.0), and "not attach importance" (for example, 0.1). A default value is, as an example, the "standard". As $\lambda_1$, $\lambda_2$, and $\lambda_3$, values obtained by dividing the set values by a total number of nodes, a total number of train lines, the number of evaluation target nodes, or the like may be used. Evaluation indicators to which the user attaches more importance can be set by the pulldown lists 8, 9, and 10. Therefore, the user can efficiently perform trial and error and obtain a diagram demanded by the user.

Items 11 to 19 are items for setting the number-of-trains condition.

The item 13 represents the time periods set by the pulldown lists 4 and 5. The number of trains in two directions (for example, inbound and outbound) corresponding to the time periods can be set by the items 11, 12, and 14 to 18.

The items 11 and 12 represent direction names, for example, names such as inbound and outbound. In FIG. 29, the item 11 represents the "inbound" direction and the item 12 represent the "outbound" direction and vice versa.

The items 15 and 18 represent set numbers of trains (numbers of trains by time periods) corresponding to the directions of "inbound" and "outbound". In the items 15 and 18, in default, the numbers of trains corresponding to time periods in an original diagram (that is, the numbers of reference nodes included in the time periods) are displayed (in FIG. 29, description of the numbers of trains is omitted and a blank is displayed).

The items 14 and 16 are buttons for moving the number of trains to preceding and following time periods with respect to the direction of "inbound". The items 17 and 19 are buttons for moving the number of trains to preceding and following time periods with respect to the direction of "outbound". The items 14, 16, 17, and 19 can be respectively pressed as buttons.

For example, the item 14 is a function of, according to button pressing, reducing the number of trains by time period of "inbound" in the item 15 by one and increasing the number of trains by time period of "inbound" in a row immediately above the item 15 by one. The item 16 is a function of, according to button pressing, reducing the number of trains by time period of "inbound" in the item 15 by one and increasing the number of trains by time period of "inbound" in a row immediately below the item 15 by one. The item 17 is a function of, according to button pressing, reducing the number of trains by time period of "outbound" in the item 18 by one and increasing the number of trains by time period of "outbound" in a row immediately below the item 18 by one. The item 19 is a function of, according to button pressing, reducing the number of trains by time period of "outbound" in the item 18 by one and increasing the number of trains by time period of "outbound" in a row immediately below the item 18 by one. The item 14 and the item 17 are not displayed in a top row. When the number of trains by time period of "inbound" of the item 15 is 0, the item 14 cannot be pressed. The item 16 is not displayed in a last row. When the number of trains by time period of "inbound" is 0, the item 16 cannot be pressed.

The items 11 to 19 described above are input interfaces for preventing a situation in which a total of set numbers of trains is different from a total number of trains of the original diagram and a solution is not obtained. With the input interfaces, there is an effect that input work can be efficiently performed.

Lastly, after inputting the above, the user presses the button 1, whereby processing by the diagram processor 500 is executed.

Figure 30:
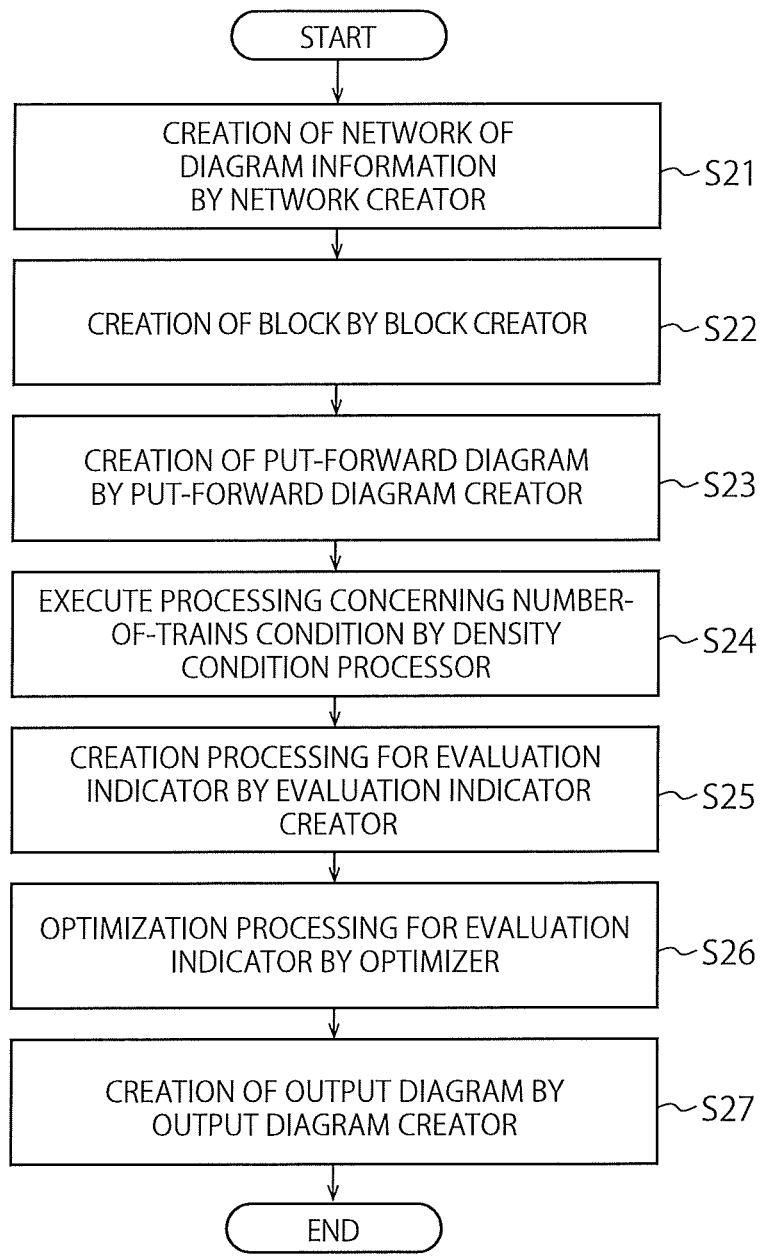
FIG. 30 is a flowchart showing an example of processing by the diagram creation apparatus shown in FIG. 1.

FIG. 30 is a flowchart showing an example of processing by the diagram creation apparatus shown in FIG. 1. The network creator 520 creates a network of a diagram based on the diagram (the first diagram) 210 and the event-to-event interval information 211 in the storage 111 (S21).

The block creator 521 collects, based on the network of the diagram, a group of events (nodes), relative positions of which cannot be changed, into one block to thereby create a plurality of blocks (S22). For example, when speed in an arc is fixed, relative positions of nodes at both ends of the arc cannot be changed. Therefore, the nodes are included in one block. When speed between arcs can be changed, each of individual nodes only has to be created as a block (a block including one node).

The front-packed diagram creator 522 decides earliest time in order from time of a node belonging to a block present temporally earliest to create a front-packed diagram in which times of all nodes are provisionally determined (S23).

The density condition processor 523 creates, based on the number-of-trains condition information 220 in the storage 112, for nodes of evaluation targets of train lines (a set of stations and events set as evaluation targets), restriction conditions for lower limit times and upper limit times of the nodes such that a designated number of nodes are included in each of time periods (S24)

The evaluation indicator creator 524 creates, based on the balance condition information 221 in the storage 112, an evaluation indicator (a first evaluation indicator) relating to standardization including variables representing shift amounts of the blocks (adjustment amounts of times of nodes included in the blocks) (S25). The evaluation indicator creator 524 creates, based on the quick-deliverability evaluation condition information 230 in the storage 113, an evaluation indicator (a second evaluation indicator) relating to quick-deliverability including the variables (S25). The evaluation indicator creator 524 creates, based on the delay evaluation target information 240 and the delay time distribution information 241 in the storage 114, an evaluation indicator (a third evaluation indicator) relating to delay robustness including the variables (S25).

The optimizer 525 calculates a sum of the evaluation indicators created by the evaluation indicator creator 524 to thereby create an objective function (an evaluation function) (S26). The optimizer 525 optimizes or quasi-optimizes (for example, to minimum or a threshold or less) under the restriction condition created in step S24 or other restriction conditions to thereby calculate values (adjustment amounts or shift values) of the variables (S26).

The output diagram creator 390 creates the output diagram 510 based on the calculated values of the variables and the front-packed diagram 300 (S27). More specifically, the output diagram creator 390 adds the calculated values of the variables to the times of the nodes (the events) in the front-packed diagram 300 to thereby create the output diagram 510. The created output diagram 510 is stored in the storage 117. The display 400 displays the output diagram 510 stored in the storage 117.

As described above, according to the present embodiment, by minimizing the objective function based on the evaluation indicators relating to the standardization, the quick-deliverability, and the delay robustness under the restriction condition based on the number-of-trains condition or the like, it is possible to quickly create a diagram satisfying various requests for the number-of-trains condition, the standardization, the quick-deliverability, and the delay robustness.

[Modification 1]

The front-packed diagram is created in the embodiment described above. However, the processing by the density condition processor 523 and the subsequent processing may be performed without creating the front-packed diagram. In such a case as well, it is possible to perform the same processing as the processing in the present embodiment by defining the variable x to take not only a positive value but also a negative value as movement amounts of the blocks. In such a case, in the embodiment described above, the blocks are disposed to satisfy the restriction of the minimum interval time when the front-packed diagram is created. Therefore, it is unnecessary to consider the restriction of the minimum interval time in the optimization processing. That is, the processing satisfying the restriction of the minimum interval time is performed at a point in time when the front-packed diagram is created. When the front-packed diagram is not created, as a part of the restriction condition in the optimization processing, a condition that a time interval between events is set to a time interval equal to or longer than a time interval indicated by the event-to-event interval information only has to be added. Processing for satisfying the restriction of the minimum interval time in this way may be performed at a point in time of the creation of the front-packed diagram or may be performed at a point in time of the optimization processing.

[Modification 2]

The optimization processing may be performed by adding a restriction condition for fixing a part of the original diagram. For example, in some case, only for the departure time at the station A, the same time as the time of the original diagram or specific time is desired to be used. In such a case, a restriction condition for fixing time of a departure event (a fourth event) at the station A, which is a predetermined event, is added. $U_j=L_3=t^*j$ only has to be set in the formulation: "$t^*j$" represents time desired to be set for the node j. When it is desired to preserve the time of the original diagram as much as possible, $U_j=t^*_j-A$, $L_j=t^*_3+A$, and the like only have to be set in the formulation and mathematical modeling for reducing A as much as possible only has to be implemented.

[Modification 3]

A part of the plurality of evaluation indicators described above may not be used. For example, the quick-deliverability condition may not be used as the evaluation indicator. In such a case, $\lambda_2=0$ only has to be set. The quick-deliverability evaluation condition input unit 130, the quick-deliverability evaluation condition information 230, and the storage 113 are unnecessary as components. The delay robustness may not be used as the evaluation indicator. In such a case, $\lambda_3=0$ only has to be set. The delay evaluation condition input unit 140, the delay evaluation target information 240, the delay time distribution information 241, and the storage 114 are unnecessary as components.

[Modification 4]

When a solution satisfying the restriction condition is not obtained in the optimization processing, indication to that effect and it's reason may be presented to the user. For example, when the number of trains per one hour is too large in the number-of-trains condition information 220, in some case, a predetermined interval time cannot be secured between train lines (between nodes of different train lines) and a solution satisfying the balance condition is not obtained. In such a case, indication to that effect and information indicating it's reason may be output to the display 400.

[Modification 5]

The evaluation function may be changeable by the user. For example, the user may be able to freely input, from a screen (with, for example, a slide bar), the weights $\lambda_1$, $\lambda_2$ and $\lambda_3$ relating to the respective evaluation indicators of the balance condition, the quick-deliverability, and the delay robustness of Equation (15). For example, a user who desires to attach more importance to the balance condition sets a relatively large value to $\lambda_1$. In this way, the user can freely adjust the evaluation function.

(Hardware Configuration)

Figure 31:
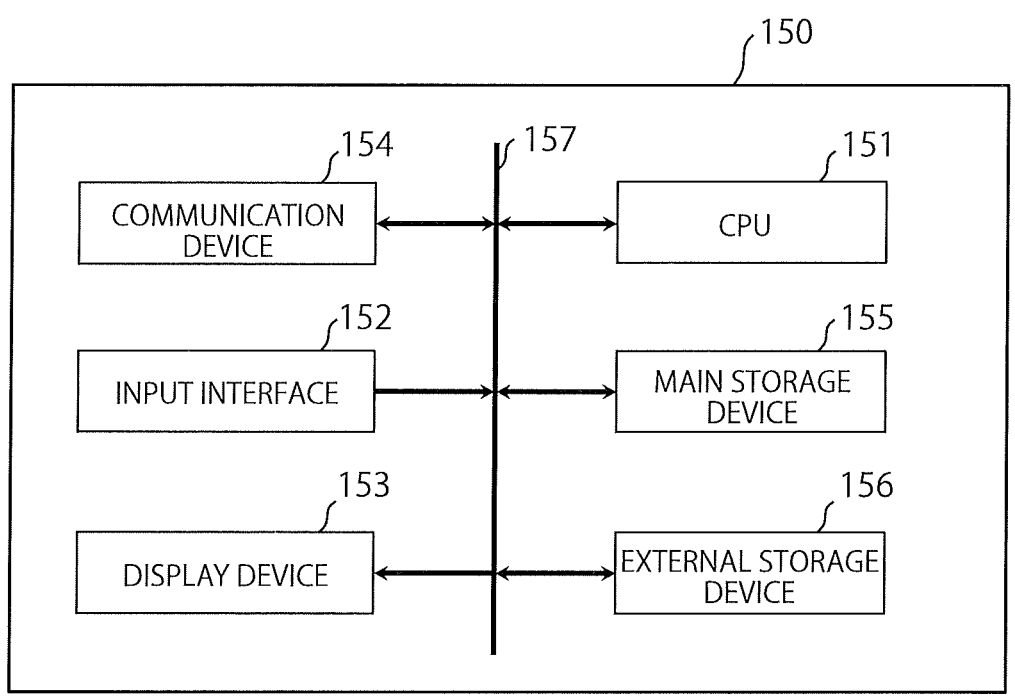
FIG. 31 shows a hardware configuration of the diagram creation apparatus (the information processing apparatus) according to the embodiment.

FIG. 31 illustrates a hardware configuration of the diagram creation apparatus (information processing apparatus) in the present embodiment. The information processing apparatus in the present embodiment is configured with a computer device 150. The computer device 150 includes a CPU 151, an input interface 152, a display device 153, a communication device 154, a main storage device 155 and an external storage device 156, which are connected to each other with a bus 157.

The CPU (central processing unit) 101 executes a computer program on the main storage device 155. The program is a program which realizes the above-described respective functional components of the information processing apparatus 101. Each functional component is realized by the CPU 151 executing the program.

The input interface 152 is a circuit for inputting an operation signal from an input device such as a keyboard, a mouse and a touch panel to the information processing apparatus 101. The input function of the elements 110, 120, 130 and 140 can be implemented in the input interface 152.

The display device 153 displays data or information output from the information processing apparatus. While the display device 153 is, for example, an LCD (Liquid Crystal Display), an organic electroluminescence display, a CRT (Cathode Ray Tube) or a PDP (Plasma Display Panel), the display device 153 is not limited to these. The data or information output from the computer device 150 can be displayed at this display device 153. The display 400 can be implemented in the display device 153.

The communication device 154 is a circuit for the information processing apparatus 101 to perform communication with an external device in a wireless or wired manner. Data can be input from the external device via the communication device 154. Information input from the external device can be stored in the DB. The communication function of the elements 110, 120, 130 and 140 can be implemented in the communication device 154.

The main storage device 155 stores the program for realizing processing of the present embodiment, data necessary for execution of the program, data generated by execution of the program, or the like. The program is expanded on the main storage device 155 and executed. While the main storage device 155 is, for example, a RAM, a DRAM and an SRAM, the main storage device 155 is not limited to these. Each DB and each storage may be constructed on the main storage device 155.

The external storage device 156 stores the program, data necessary for execution of the program, data generated by execution of the program, or the like. These program and data are read out to the main storage device 155 in the processing of the present embodiment. While the external storage device 156 is, for example, a hard disk, an optical disk, a flash memory, and a magnetic tape, the external storage device 156 is not limited to these. Each DB and each storage may be constructed on the external storage device 156.

Note that the program may be installed in the computer device 150 in advance or may be stored in a storage medium such as a CD-ROM. Further, the program may be uploaded on the Internet.

The computer device 150 may be provided with one or more processors 151, input interfaces 152, display devices 153, communication devices 154 and main memories 155, and peripheral equipment such as a printer and a scanner may be connected to the computer device 150.

Further, the computer device 150 may be configured with a single computer device 150 or may be configured as a system including a plurality of computer devices 150 which are connected to each other.

While certain approaches have been described, these approaches have been presented by way of example only, and are not intended to limit the scope of the inventions. Indeed, the apparatuses described herein may be embodied in a variety of other forms; furthermore various omissions, substitutions and changes in the form of the apparatuses described herein may be made. The accompanying claims and their equivalents are intended to cover such forms or modifications as would fall within the scope of the inventions.

The invention claimed is:

1. An information processing apparatus comprising:
a diagram processor configured to
set, based on a first diagram of first to n-th train lines including at least one time of: times of departure of a vehicle from stop positions, times of arrival of the vehicle at the stop positions, and times of pass of the vehicle through the stop positions, a plurality of variables representing an adjustment amount of the time for each of the stop position for each of the first to n-th train lines,
perform at least two of a first process, a second process and a third process to create a plurality of evaluation indicator including at least two of a first evaluation indicator, a second evaluation indicator and a third evaluation indicator,
the first process being a process for creating the first evaluation indicator for leveling an interval of time of departure from, arrival at, or passing through at least one first stop location to be evaluated for the stop locations based on the plurality of variables, the first evaluation indicator including the plurality of variables,
the second process being a process for creating the second evaluation indicator relating to a sum of travel times in an evaluation interval of at least one of the first to nth train lines based on the plurality of variables, the second evaluation indicator including the plurality of variables, and the third process being a process for creating the third evaluation indicator relating to a delay time for time of departure from at least one second stop position to be evaluated for the stop locations, a delay time for time of arrival at the second stop position, or a delay time for time of passing the second stop position, based on the plurality of variables and distribution information of a delay time between the stop positions, and weight the plurality of evaluation indicators, generate an objective function representing a sum of the weighted evaluation indicators, and optimize or suboptimize the objective function to obtain values of the plurality of variables; and an output diagram creator configured to add the calculated values of the plurality of variables to the times of the stop positions corresponding to the plurality of variables to create a second diagram in which times for the stop positions in the first diagram is adjusted.

2. The apparatus according to claim 1, wherein the diagram processor calculates the objective function based on a restriction condition relating to an interval of the first to n-th train lines.

3. The apparatus according to claim 2, wherein the restriction condition includes a condition on a number of train lines including:
a time of departure from a first stop position in a first period,
a time of arrival at the first stop position in a first period; or
a time of pass through the first stop position in a first period.

4. The apparatus according to claim 2, wherein the restriction condition includes, for each of vehicle types of first to n-th vehicles, a condition relating to at least one of the number of trains and a first stop position.

5. The apparatus according to claim 1, wherein the first evaluation indicator represents a sum of absolutes of differences between
a difference between (1) the time of departure from a first stop position, the time of arrival at the first stop position, or the time of pass through the first stop position and (2) a time of departure from a preceding stop position of the first stop position, a time of arrival at the preceding stop position, or a time of pass through the preceding stop position, and
a difference between (3) the time of departure from the first stop position, the time of arrival at the first stop position, or the time of pass through the first stop position and (4) a time of departure from a next stop position of the first stop position, a time of arrival at the next stop position, and a time of pass through the next stop position.

6. The apparatus according to claim 1, wherein the diagram processor creates the first evaluation indicator for each of types of first to n-th vehicles.

7. The apparatus according to claim 1, wherein the third evaluation indicator represents a sum of averages of the delay time for the time of departure from the second stop position, the time of arrival at the second stop position, or the time of pass through the second stop position.

8. The apparatus according to claim 2, wherein the diagram processor optimizes or suboptimizes the objective function under a condition that a predetermined time among the times in the first diagram is not changed.

9. The apparatus according to claim 1, wherein the diagram processor optimizes or suboptimizes the objective function under a condition that a time interval between the stop positions is equal to or larger than a time interval indicated by interval information.

10. The apparatus according to claim 1, wherein
the diagram processor converts the times into a plurality of blocks for each of the first to n-th train lines,
the adjustment amount represents an adjustment amount of time in block units, and
the output diagram creator creates the second diagram based on the plurality of blocks and the calculated adjustment amount.

11. The apparatus according to claim 10, wherein the diagram processor collects a time of departure from a stop position at a start of a section of running without dwelling, a time of arrival at a stop position at an end of the section, and all times existing between the time of departure and the time of arrival into one block.

12. The apparatus according to claim 1, wherein
the first to n-th train lines include at least one event,
the event includes
the stop position and,
the time of departure of the vehicle from the stop positions, the time of arrival of the vehicle at the stop position, or the time of pass of the vehicle through the stop position, and
the diagram processor optimizes or suboptimizes the objective function to obtain an adjustment amount of the time of the event in the first to n-th train lines and creates the second diagram based on the adjustment amount and the first diagram.

13. An information processing method comprising:
reading out, from a memory, a first diagram of first to n-th train lines including at least one time of: times of departure of a vehicle from stop positions, times of arrival of the vehicle at the stop positions, and times of pass of the vehicle through the stop positions;
setting a plurality of variables representing an adjustment amount of the time for each of the stop position for each of the first to n-th train lines based on the first diagram;
performing at least two of a first process, a second process and a third process to create a plurality of evaluation indicator including at least two of a first evaluation indicator, a second evaluation indicator and a third evaluation indicator,
the first process being a process for creating the first evaluation indicator for leveling an interval of time of departure from, arrival at, or passing through at least one first stop location to be evaluated for the stop locations based on the plurality of variables, the first evaluation indicator including the plurality of variables,
the second process being a process for creating the second evaluation indicator relating to a sum of travel times in an evaluation interval of at least one of the first to nth train lines based on the plurality of variables, the second evaluation indicator including the plurality of variables, and
the third process being a process for creating the third evaluation indicator relating to a delay time for time of departure from at least one second stop position to be evaluated for the stop locations, a delay time for time of arrival at the second stop position, or a delay time for time of passing the second stop position, based on the plurality of variables and distribution information of a delay time between the stop positions;

weighting the plurality of evaluation indicators, generating an objective function representing a sum of the weighted evaluation indicators, and optimizing or sub-optimizing the objective function to obtain values of the plurality of variables; and adding the calculated values of the plurality of variables to the times of the stop positions corresponding to the plurality of variables to create a second diagram in which times for the stop positions in the first diagram is adjusted.

14. A non-transitory computer readable medium having a computer program stored therein which causes a computer when the computer program is executed by the computer to perform processes comprising:

reading out, from a memory, a first diagram of first to n-th train lines including at least one time of: times of departure of a vehicle from stop positions, times of arrival of the vehicle at the stop positions, and times of pass of the vehicle through the stop positions;

setting a plurality of variables representing an adjustment amount of the time for each of the stop position for each of the first to n-th train lines based on the first diagram;

performing at least two of a first process, a second process and a third process to create a plurality of evaluation indicator including at least two of a first evaluation indicator, a second evaluation indicator and a third evaluation indicator, the first process being a process for creating the first evaluation indicator for leveling an interval of time of departure from, arrival at, or passing through at least one first stop location to be evaluated for the stop locations based on the plurality of variables, the first evaluation indicator including the plurality of variables, the second process being a process for creating the second evaluation indicator relating to a sum of travel times in an evaluation interval of at least one of the first to nth train lines based on the plurality of variables, the second evaluation indicator including the plurality of variables, and the third process being a process for creating the third evaluation indicator relating to a delay time for time of departure from at least one second stop position to be evaluated for the stop locations, a delay time for time of arrival at the second stop position, or a delay time for time of passing the second stop position, based on the plurality of variables and distribution information of a delay time between the stop positions;

weighting the plurality of evaluation indicators, generating an objective function representing a sum of the weighted evaluation indicators, and optimizing or sub-optimizing the objective function to obtain values of the plurality of variables; and adding the calculated values of the plurality of variables to the times of the stop positions corresponding to the plurality of variables to create a second diagram in which times for the stop positions in the first diagram is adjusted.

15. The apparatus according to claim 1, further comprising a display configured to present a screen for a user to input information regarding the weights of the first evaluation indicator, said second evaluation indicator, and said third evaluation indicator, and the diagram processor weights the first evaluation indicator, the second evaluation indicator, and the third evaluation indicator based on the information input by the user.

16. The apparatus according to claim 15, wherein the display presents a user-selectable level of importance for the first indicator, the second indicator, and the third indicator, respectively, and the display presents the user-selectable level of importance for the first, second, and third evaluation indicators, respectively, and the diagram processor weights the first indicator, the second indicator, and the third indicator according to the level selected by the user.

* * * * *